United States Patent
Wang et al.

(10) Patent No.: US 12,374,104 B2
(45) Date of Patent: Jul. 29, 2025

(54) SYSTEMS AND METHODS FOR QUANTIFYING AGROECOSYSTEM VARIABLES THROUGH MULTI-TIER SCALING FROM GROUND DATA, TO MOBILE PLATFORMS, AND TO SATELLITE OBSERVATIONS

(71) Applicant: The Board of Trustees of the University of Illinois, Urbana, IL (US)

(72) Inventors: Sheng Wang, Urbana, IL (US); Kaiyu Guan, Urbana, IL (US); Bin Peng, Urbana, IL (US); Chongya Jiang, Urbana, IL (US); Sibo Wang, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 380 days.

(21) Appl. No.: 18/005,022

(22) PCT Filed: Jul. 9, 2021

(86) PCT No.: PCT/US2021/041051
§ 371 (c)(1),
(2) Date: Jan. 10, 2023

(87) PCT Pub. No.: WO2022/011236
PCT Pub. Date: Jan. 13, 2022

(65) Prior Publication Data
US 2023/0334852 A1 Oct. 19, 2023

Related U.S. Application Data

(60) Provisional application No. 63/180,811, filed on Apr. 28, 2021, provisional application No. 63/050,534, filed on Jul. 10, 2020.

(51) Int. Cl.
G06V 20/10 (2022.01)
G06V 20/13 (2022.01)

(52) U.S. Cl.
CPC ............ G06V 20/188 (2022.01); G06V 20/13 (2022.01)

(58) Field of Classification Search
CPC ...................... G06V 20/188; G06V 20/13
(Continued)

(56) References Cited

U.S. PATENT DOCUMENTS 11,694,095 B2 * 7/2023 Akkurt ................ G01V 5/10
706/12
2010/0189343 A1 * 7/2010 Berrill ................ G06T 17/05
382/154

(Continued)

OTHER PUBLICATIONS

Asner et al., "Airborne laser-guided imaging spectroscopy to map forest trait diversity and guide conservation," Science, Jan. 27, 2017, vol. 355, pp. 385-389, 44 pages (with supplementary materials).

(Continued)

*Primary Examiner* — Michael R Neff
(74) *Attorney, Agent, or Firm* — McKee, Voorhees & Sease, PLC

(57) ABSTRACT

The ability to scale data can provide numerous advantages, especially with regard to agricultural information. For example, agroecosystems include land and data associated with the land, such as physical traits and information. This can include, for example, information related to the soil, crops, other vegetation, and other information related to the land. In order to be able to quickly and accurately know such information and traits, ground truth data can be scaled using aerial and/or satellite imagery. Models and other machine learning can utilize ground truth data to scale limited field area data (e.g., 0.1-1 km) and accurately apply the same to (Continued)

large swaths of land (e.g., >100 km$^2$) with accuracy for the field traits and/or characteristics.

20 Claims, 12 Drawing Sheets

(58) Field of Classification Search
USPC .......................................................... 382/110
See application file for complete search history.

(56) References Cited

U.S. PATENT DOCUMENTS

| | | | |
|---|---|---|---|
| 2016/0286175 A1* | 9/2016 | Dvorak | G01S 19/14 |
| 2017/0251134 A1* | 8/2017 | Zhang | G01J 3/36 |
| 2022/0012820 A1* | 1/2022 | Danzl | G01S 17/89 |

OTHER PUBLICATIONS

Asner et al., "High-resolution forest carbon stocks and emissions in the Amazon," PNAS, Sep. 21, 2010, vol. 107, No. 38, pp. 16738-16742.
Asner et al., "Progressive forest canopy water loss during the 2012-2015 California drought," PNAS, Dec. 28, 2015, pp. E249-E255.

* cited by examiner

SYSTEMS AND METHODS FOR QUANTIFYING AGROECOSYSTEM VARIABLES THROUGH MULTI-TIER SCALING FROM GROUND DATA, TO MOBILE PLATFORMS, AND TO SATELLITE OBSERVATIONS

CROSS REFERENCE TO RELATED APPLICATIONS

This application claims priority under 35 U.S.C. § 119 to provisional patent application U.S. Ser. No. 63/050,534 filed Jul. 10, 2020, and U.S. Ser. No. 63/180,811, filed Apr. 28, 2021. These provisional patent applications are herein incorporated by reference in their entirety, including without limitation, the specifications, claims, and abstracts, as well as any figures, tables, appendices, or drawings thereof.

STATEMENT AS TO FEDERALLY SPONSORED RESEARCH

This invention was made with government support under DE-SC0018420 awarded by the Department of Energy. The government has certain rights in this invention.

FIELD OF THE INVENTION

Aspects and/or embodiments of the subject disclosure relate to systems and methods for quantifying agroecosystem variables through multi-tier scaling from ground data, to mobile platforms, and to satellite observations.

BACKGROUND OF THE INVENTION

Food security faces great challenges, both domestically and internationally, and one key challenge lies in the lack of granular, accurate, efficient, and timely data collection to monitor agriculture. Accurate, timely, and efficient methodologies to monitor large-scale crop and soil traits are important for sustainable agricultural management. Various conventional approaches (e.g., destructive field sampling) miss the opportunity of using novel advancements in sensing technology and converging sciences, which lead to large stagnancy and inefficiency in data collection and downstream policymaking. Furthermore, a traditional way to collect ground truth data of crop and soil traits in the agricultural study is typically limited to a few traits. Agriculture study and application is in shortage of ground truth data about various kinds of soil and crop traits and management practice data.

Remote sensing approaches have traditionally shown great potential to monitor large-scale crop growth conditions in a fast, effective, and non-destructive manner. However, remote sensing retrieval directly operated at the satellite scale (e.g., 0.1-1 km) traditionally has uncertainties for scale mismatch between the coarse resolution satellite pixel and field measurements. Though a few satellites can offer high spatial resolution (e.g., 0.2-3 m) data, they typically have very few available wavelength bands and typically cannot offer reliable estimates on crop and soil traits. Mobile systems such as airborne or ground imaging techniques (e.g., hyperspectral) can traditionally provide rich information on the spectral signatures and have been demonstrated as a promising tool to accurately estimate soil and crop traits, such as leaf nitrogen content, chlorophyll content, and photosynthetic capacity, and management practices. However, the airborne technique is typically only suitable for agriculture monitoring at the landscape scale (e.g., coverage <100 km$^2$), and not the continental scale (due at least in part to airborne's high cost).

Thus, there exists a need in the art for a method and associated system which provides for the quantifying of agroecosystem variables at a large scale (i.e., wide area), while incorporating the accuracy associated with ground truth data acquisition.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage of the invention to provide a quick, easy, and accurate model to scale known field data to large scale use. For example, ground truth data can be turned into data for an entire region, including data for any of the land within the region.

It is still yet a further object, feature, and/or advantage of the invention to provide information to reduce the risks associated with precision agriculture.

The systems and/or methods disclosed herein can be used in a wide variety of applications. For example, the technology can be used to validate field-scale land management practices for applying nitrogen and then scaled to analyze large-scale outcomes. The disclosed technology could be used commercially to measure land resources and performance for a number of industries, including agriculture, bioenergy, real estate, insurance, agronomy, water management, nutrient management, agriculture product logistics and supply chain, greenhouse gas creation and sequestration, government indices and reporting, and responses to and identification of climate change. The disclosed technology can also be used to project future performance and to build scenarios to test the outcomes of changes in land management practices. The system can be used for applications including: (1) to develop a regional- or national-scale reporting system to track every field's management practices (e.g. no-till, cover crop) and other practices for bioenergy and agricultural industries; (2) to develop a platform to provide field-level agricultural "ground-truth" information for different stakeholders, including government, researchers, farmers, and the agriculture supply chain; (3) to develop a regional- or national-scale system to provide necessary inputs to enable the quantification of carbon emission and sequestration for different land; and (4) to develop a regional- or national-scale high-accuracy crop monitoring system that can directly provide farmers of information for field-level precision agriculture management (e.g. nitrogen fertilizer application), and enable disaster responses and real-time crop assessment (e.g. hail storm, flooding, droughts) for government, farmers, and companies in the related industries.

According to some aspects of the present disclosure, a non-transitory computer-readable storage medium comprising executable instructions that, when executed by a processing system including a processor, perform operations including obtaining a first-tier dataset including ground truth values of agroecosystem variables, wherein the first-tier dataset has a first-tier geographic footprint, and wherein the ground truth values have been collected via field measurements, obtaining a second-tier dataset including second-tier values of the agroecosystem variables, wherein the second-tier dataset has been collected from one or more mobile systems, wherein the second-tier dataset has a second-tier geographic footprint, wherein the second-tier geographic footprint is larger than the first-tier geographic footprint, and wherein the second-tier geographic footprint at least partially overlaps with the first-tier geographic footprint in a first-tier overlapped area; obtaining a third-tier dataset including third-tier values of the agroecosystem variables, wherein the third-tier dataset has been collected from one or more satellite systems, wherein the third-tier dataset has a third-tier geographic footprint, wherein the third-tier geographic footprint is larger than the second-tier geographic footprint, and wherein the third-tier geographic footprint at least partially overlaps with the second-tier geographic footprint in a second-tier overlapped area; generating estimates of values of the agroecosystem variables by applying at least a first-tier model across at least a part of the second-tier geographic footprint, wherein the at least the first-tier model uses the first-tier dataset for first-tier labels, and wherein the at least the first-tier model uses the second-tier dataset for first-tier inputs; and generating estimates of secondary values of the agroecosystem variables by applying at least a second-tier model across at least a part of the third-tier geographic footprint, wherein the at least the second-tier model uses the second-tier dataset for second-tier labels, and wherein the at least the second-tier model uses the third-tier dataset for second-tier inputs.

According to at least some aspects of some embodiments disclosed, the operations further comprise sending an output comprising the estimates of the secondary values of the agroecosystem variables, to a display screen, to a printer, to a computer file, or to any combination thereof.

According to at least some aspects of some embodiments disclosed, the operations further comprise mapping the output of the third-tier values of the agroecosystem variables on a geographic map.

According to at least some aspects of some embodiments disclosed, the applying the at least the first-tier model across at least part of the second-tier geographic footprint comprises: applying the at least the first-tier model across all of the second-tier geographic footprint; and the applying the at least the second-tier model across at least part of the third-tier geographic footprint comprises applying the at least the second-tier model across all of the third-tier geographic footprint;

According to at least some aspects of some embodiments disclosed, the field measurements have been collected from the ground; and the ground truth values obtained through direct measurements or observations without inference information include one or more agroecosystem variables based upon, for example: a leaf sample analysis, a soil sample analysis, a field-level condition analysis, a plant gas-exchange experiment, a tractor or robot-carried sensor derived soil/plant/management information, a leaf spectra derived leaf trait, LiDAR-derived crop/soil/management information, radar-derived crop/soil/management information, gamma-ray sensor derived crop/soil/management information, photo derived plant/soil/management information, or any combination thereof.

According to at least some aspects of some embodiments disclosed, the agroecosystem variables comprise: one or more crop traits; one or more soil traits; one or more agricultural management practices; or any combination thereof.

According to at least some aspects of some embodiments disclosed, the one or more crop traits comprise: one or more biochemical crop traits; one or more biophysical crop traits; or any combination thereof.

According to at least some aspects of some embodiments disclosed, the one or more soil traits comprise: one or more biochemical soil traits; one or more biophysical soil traits; or any combination thereof.

According to at least some aspects of some embodiments disclosed, the one or more crop traits comprise: one or more pigments; one or more biophysical properties; one or more biochemical properties; one or more crop functional properties; one or more crop stress conditions; or any combination thereof.

According to at least some aspects of some embodiments disclosed, the one or more soil traits comprise: one or more physical properties; one or more chemical properties; one or more soil functional properties; one or more amounts of soil organic carbon; or any combination thereof.

According to at least some aspects of some embodiments disclosed, the operations further comprise training a classifier of the first tier model using the first tier dataset that is overlapped with the second-tier geographic footprint that at least partially overlaps with the first-tier geographic footprint in a first tier overlapped area.

According to at least some aspects of some embodiments disclosed, the operations further comprise training a classifier of the second tier model using the second tier dataset that is overlapped with the third-tier geographic footprint that at least partially overlaps with the second-tier geographic footprint in a second tier overlapped area.

According to at least some aspects of some embodiments disclosed, the operations further comprise outputting a mapped area with agroecosystem variables on a display.

According to at least some aspects of some embodiments disclosed, the mapped area comprises the third tier geographic footprint overlayed with the agroecosystem variables.

According to additional aspects of the disclosure, a device comprises a processing system including a processor; and a memory that stores executable instructions that, when executed by the processing system, perform operations, the operations comprising: obtaining at least one ground truth dataset of first-tier values of agroecosystem variables, wherein the at least one ground truth dataset has a first-tier geographic footprint; obtaining at least one mobile dataset collected from at least one mobile system, wherein the at least one mobile dataset has a second-tier geographic footprint, and wherein the second-tier geographic footprint at least partially overlaps with the first-tier geographic footprint in a first-tier overlapping area; obtaining at least one satellite remote sensing dataset collected from at least one satellite system, wherein the at least one satellite remote sensing dataset has a third-tier geographic footprint, and wherein the third-tier geographic footprint at least partially overlaps with the second-tier geographic footprint in a second-tier overlapping area; configuring, for the first-tier overlapping area, one or more first-tier models which use the at least one ground truth dataset as one or more first-tier labels and which use the at least one mobile dataset as one or more first-tier inputs; generating predictions of second-tier values of the agroecosystem variables by applying the one or more first-tier models over at least a part of the second-tier geographic footprint; configuring, for the second-tier overlapping area, one or more second-tier models which use the predictions of the second-tier values of the agroecosystem variables as one or more second-tier labels and which use the at least one satellite remote sensing dataset as one or more second-tier inputs; and generating predictions of third-tier values of the agroecosystem variables by applying the one or more second-tier models over at least a part of the third-tier geographic footprint.

According to at least some aspects of some embodiments disclosed, the operations further comprise outputting the predictions of the third-tier values of the agroecosystem variables, wherein the outputting is to a display screen, to a printer, to a computer file, or to any combination thereof.

According to at least some aspects of some embodiments disclosed, the predictions of the third-tier values of the agroecosystem variables are output via a mapping of the predictions of the third-tier values of the agroecosystem variables on a geographic map.

According to at least some aspects of some embodiments disclosed, the generating the predictions of the second-tier values of the agroecosystem variables further comprises applying one or more first-tier models over at least a part of the second-tier geographic footprint; the generating the predictions of the third-tier values of the agroecosystem variables further comprises applying one or more second-tier models over at least a part of the third-tier geographic footprint; and each of the one or more first-tier models and the one or more second-tier models is based on respective machine learning, one or more respective processed-based models, or any respective combination thereof.

According to yet additional aspects of the disclosure a method comprises obtaining, by a processing system comprising a processor, first-tier data including ground truth values of agroecosystem variables, wherein the first-tier data covers a first-tier geographic region, and wherein the ground truth values have been collected via field measurements; obtaining, by the processing system, second-tier data including second-tier values of the agroecosystem variables, wherein the second-tier data is from one or more mobile systems, wherein the second-tier data covers a second-tier geographic region, and wherein the second-tier geographic region is a superset of the first-tier geographic region such that the first-tier geographic region is entirely within the second-tier geographic region; obtaining, by the processing system, third-tier data including third-tier values of the agroecosystem variables, wherein the third-tier data is from one or more satellite systems, wherein the third-tier data covers a third-tier geographic region, and wherein the third-tier geographic region is a superset of the second-tier geographic region such that the second-tier geographic region is entirely within the third-tier geographic region; applying, by the processing system, at least a first-tier model across at least a part of the second-tier geographic region in order to produce estimates of values of the agroecosystem variables, wherein the at least the first-tier model uses the first-tier data for first-tier labels, and wherein the at least the first-tier model uses the second-tier data for first-tier inputs; applying, by the processing system, at least a second-tier model across at least a part of the third-tier geographic region in order to produce estimates of other values of the agroecosystem variables, wherein the at least the second-tier model uses the second-tier data for second-tier labels, and wherein the at least the second-tier model uses the third-tier data for second-tier inputs; and outputting, by the processing system, the estimates of the other values of the agroecosystem variables, wherein the outputting is to a display screen, to a printer, to a computer file, or to any combination thereof.

According to at least some aspects of some embodiments disclosed, the second-tier data has a second-tier spatial resolution; the second-tier data has a second-tier spectral resolution; the third-tier data has a third-tier spatial resolution; the third-tier data has a third-tier spectral resolution; the second-tier spatial resolution is higher than the third-tier spatial resolution, the second-tier spectral resolution is higher than the third-tier spectral resolution; the field measurements have been collected from the ground; and the ground truth values obtained through direct measurements or observations without inference information include one or more agroecosystem variables based upon, for example: a leaf sample analysis, a soil sample analysis, a field-level condition analysis, a plant gas-exchange experiment, a tractor or robot-carried sensor derived soil/plant/management information, a leaf spectra derived leaf trait, LiDAR-derived crop/soil/management information, radar sensor-derived crop/soil/management information, gamma-ray sensor derived crop/soil/management information, ground-photo derived plant/soil/management information, or any combination thereof.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

Figure 1A:
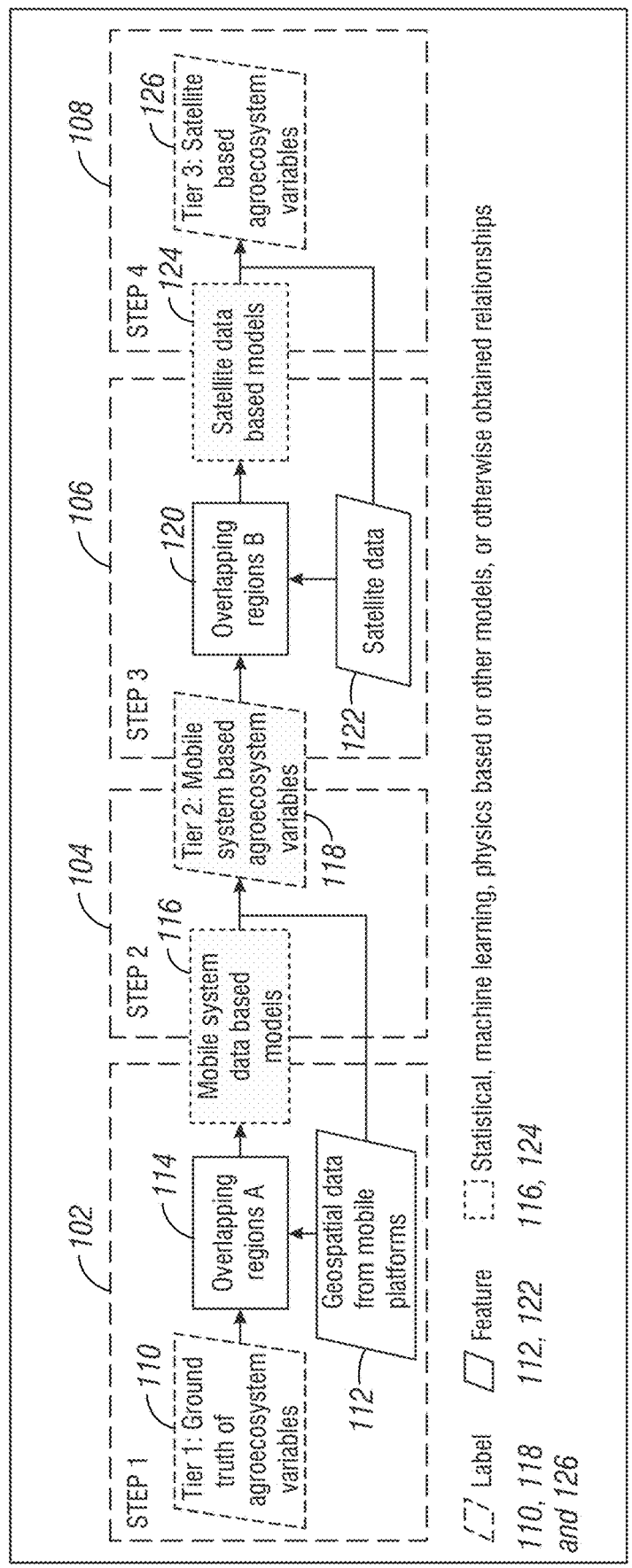
FIG. 1A is a block diagram illustrating an exemplary, non-limiting embodiment of a methodology in accordance with various aspects described herein.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The subject disclosure describes, among other things, illustrative embodiments for quantifying agroecosystem variables through multi-tier scaling from ground data, to mobile platforms, and to satellite observations. Other embodiments are described in the subject disclosure.

Various embodiments can provide methodologies of integrating field measurements, mobile system data (e.g., airborne/ground remote sensing), and satellite data through advanced modeling techniques to obtain large-scale agriculture status in a cost-effective manner. Various embodiments can operationally provide high spatial resolution, timely and accurate information of crop and soil traits, management practices, and stress conditions to ensure food security and sustainable agricultural management at national/regional levels.

Various embodiments fully utilize the information contained in different classes of remote sensing data and ground truth. Smaller-scale remote sensing missions, such as an airborne campaign or a ground-based platform, tend to collect more accurate, higher-resolution observations. Larger-scale remote sensing platforms, such as a satellite mission, tend to have lower resolution, fewer spectral bands, but greater geographical coverage. Various embodiments provide a method of using more reliable, smaller-scale missions to expand the set of labels for the training of models that use larger-scale platform data as inputs. Various embodiments build highly reliable models capable of estimating crop traits, soil properties, and/or management practices accurately using smaller-scale mobile system data collection, wherein the predictions made by these models in the full footprint of the datasets can be treated as labels while optimizing other model(s) for the larger-scale remote sensing data, and the latter model(s) can be applied to all the large-scale remote sensing data.

Various embodiments can operationally provide high spatiotemporal resolution maps of crop and/or soil traits for every individual farmland management unit at continental scales. The biochemical and biophysical crop traits can include: genotypes, pigments (e.g., chlorophyll, carotenoids, and/or senescent materials); biophysical properties (e.g., leaf area index, leaf mass per area, leaf water content, leaf water potential, and/or leaf angle distribution); biochemical properties (e.g., nitrogen content, phosphorus content, carbon content, fiber content, sugar content, lignin content, cellulose content, calcium content, iron content, potassium content, and/or magnesium content); functional properties (e.g., photosynthetic capacity, stomatal conductance, photosynthesis rate, transpiration rate, and/or crop yield); and/or crop stress conditions (e.g., water and drought stress, nutrient stress, heat stress, hail storm stress, flooding and ponding stresses, plant pathogen stress, and/or disease stresses). The estimated soil traits can include: physical properties (e.g., texture, porosity, bulk density, moisture, and/or surface roughness); chemical properties (e.g., organic carbon content, nitrogen content, phosphorus content, aluminum content, potassium content, calcium content, carbonate content, iron content, and/or sulphate content); functional properties (e.g., cation-exchange capacity, pH, respiration rate, and/or evaporation rate); and/or management practices (e.g., tillage intensity and types, residue cover fraction, cover crop adoption, irrigation practices, erosion rate, planting and harvesting date, planting species, tile drainage condition, and/or cropping system).

Figure 1B:
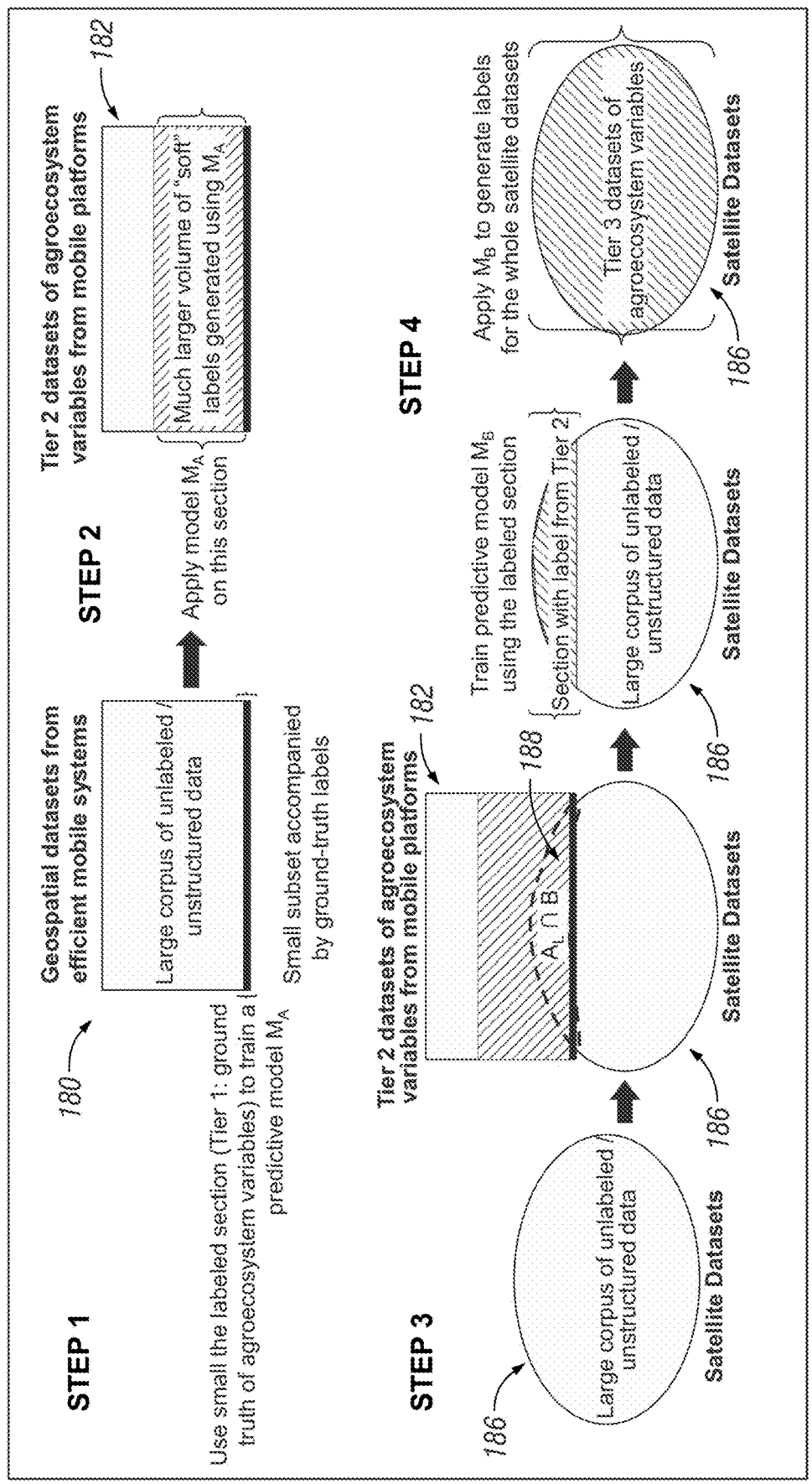
FIG. 1B is a block diagram illustrating an exemplary, non-limiting embodiment of various details related to the methodology of FIG. 1A in accordance with various aspects described herein.
Figure 2:
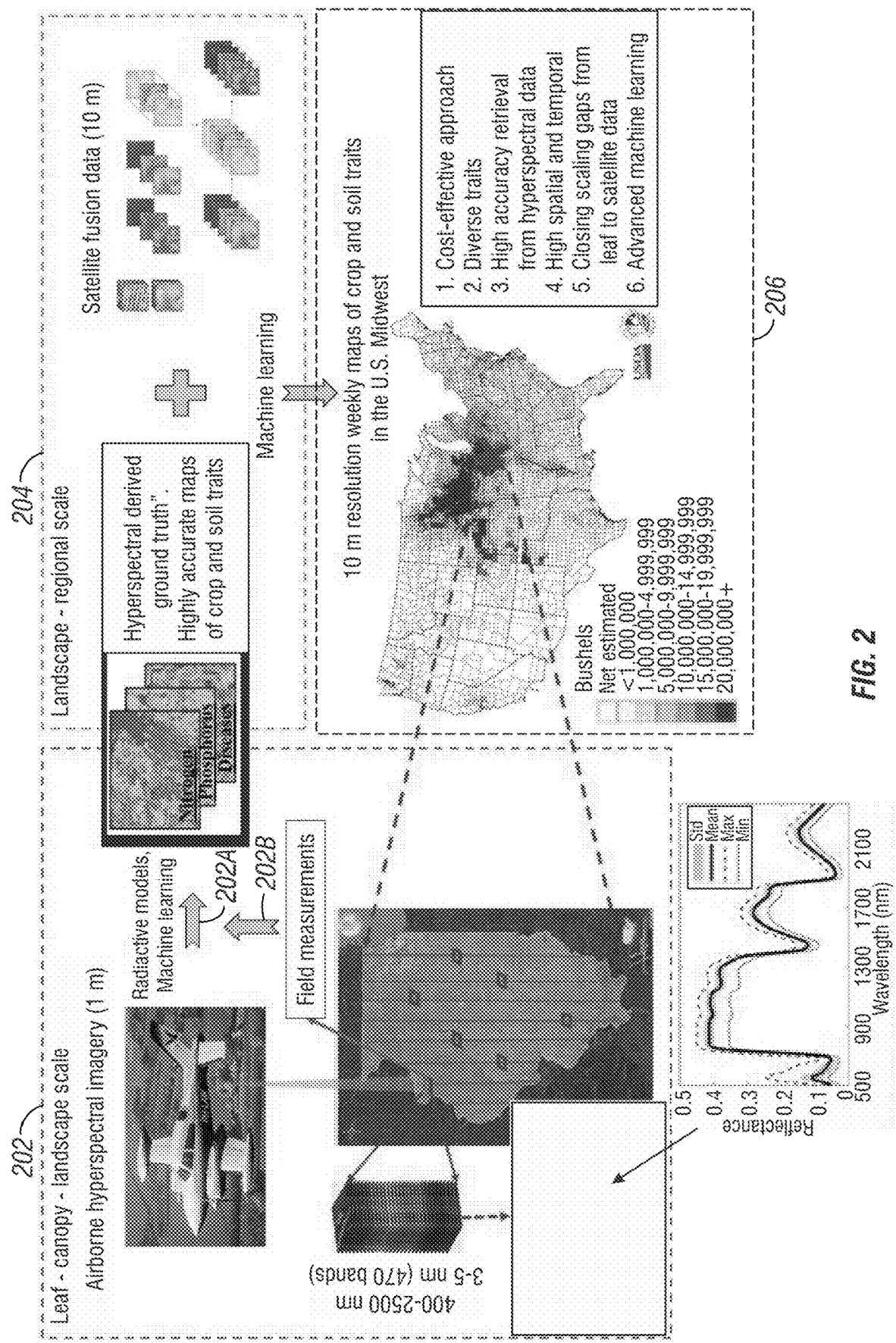
FIG. 2 is a block diagram illustrating an exemplary, non-limiting embodiment of a methodology in accordance with various aspects described herein.

Various embodiments can integrate mobile sensing data (e.g., airborne imaging) and satellite data to accurately, timely, economically, and comprehensively monitor croplands from the sub-field to regional scale. An example of a detailed workflow to integrate ground truth data, mobile system data (which can, in various embodiments, derive quasi "ground truth" data such as airborne-based estimates that have very high accuracy and are very close to the real (or actual) ground truth), satellite data, and models according to an embodiment is shown in FIGS. 1A and 1B. In this embodiment, one or more models are developed to link, for example, the airborne platform-derived quasi "ground truth" of crop and soil traits to satellite data (e.g., STAIR fusion data) in the overlapped regions. Then, the developed model(s) are applied to the entire satellite data to extend the estimates of crop and soil traits to a large scale, e.g., the entire U.S. Corn Belt. FIG. 2 shows an example of an embodiment that applies an airborne-satellite integrative methodology in routine applications, and thus can significantly improve crop stress detection and management for every individual field in the U.S. and beyond. Various embodiments can provide metrics on the crop and soil traits and can have great benefits for agricultural stakeholders (e.g., governmental sectors, researchers, agricultural value chains and supply chains, and/or farmers) for agricultural monitoring at large scales.

As described herein, various embodiments can provide systems and methods for bridging multiple levels (e.g., ground vehicles, manned airborne vehicles, unmanned aerial vehicles, and/or satellite) of remote sensing and ground truth data in training scalable models for monitoring agroecosystem crop traits, soil properties, and management practices. Various embodiments use intermediate levels of remote sensing product data (for example, in terms of accuracy, spatial resolution, temporal frequency and/or scalability) to expand the size of the labels using separate models capable of generalizing predictions with high confidence that can be treated as labels when training larger-scale models. Various embodiments of the disclosed framework can be utilized to accurately monitor (e.g., for agricultural land) large-scale crop and soil traits with high spatial resolution (e.g., 0.2-10 meter) and high temporal resolution. Various embodiments can be operationally used to monitor growth conditions of major crops (e.g., corn, soybean, wheat, sorghum, and/or miscanthus) and/or soil properties (e.g., soil organic matter) and/or farming management practices (e.g., planting date, harvesting date, tillage practice, cover crop adoption).

As described herein, various embodiments can utilize four major steps: (1) for the overlapped geographic footprints of ground truth data (called "Tier 1 data" here) and mobile system data, configure model(s) and/or relationship(s) to estimate first-tier values of agroecosystem variables, wherein the model(s) and/or relationship(s) use the Tier 1 data as label(s), and use the mobile system data as input(s); (2) generate predictions of second-tier values of the agroecosystem variables (called "Tier 2 data" here) by applying the model(s) and/or relationship(s) of Step (1) over the whole or part of the geographic footprint of the mobile system data; (3) for the overlapped geographic footprints of the mobile system data and the satellite data, configure other model(s) and/or relationship(s) to estimate third-tier values of the agroecosystem variables, wherein the other model(s) and/or relationship(s) use the Tier 2 data as label(s), and use the satellite data as input(s); and (4) generate predictions of fourth values of the agroecosystem variables (called "Tier 3 data" here) by applying the other model(s) and/or relationship(s) of Step (3) over the whole or part of the geographic footprint of the satellite data.

As described herein, in various embodiments the estimated crop biochemical and biophysical traits can comprise one or more of: genotypes, pigments (e.g., chlorophyll, carotenoids, and/or senescent materials); biophysical properties (e.g., leaf area index, leaf mass per area, leaf water content, leaf water potential, and/or leaf angle distribution); biochemical properties (e.g., nitrogen content, phosphorus content, carbon content, fiber content, sugar content, lignin content, cellulose content, calcium content, iron content, potassium content, and/or magnesium content); functional properties (e.g. photosynthetic capacity, stomatal conductance, photosynthesis rate, transpiration rate, and/or crop yield); and/or crop stress conditions (e.g., water and drought stress, nutrient stress, heat stress, hail storm stress, flooding and ponding stress, plant pathogen/disease stress, and/or disease stress).

As described herein, in various embodiments the estimated soil traits can comprise one or more of: physical properties (e.g., texture, porosity, bulk density, moisture, and/or surface roughness); chemical properties (e.g., organic carbon content, nitrogen content, phosphorus content, aluminum content, potassium content, calcium content, carbonate content, iron content, and/or sulphate content); functional properties (e.g., cation-exchange capacity, pH, respiration rate, and/or evaporation rate); and/or management practices (e.g., tillage intensity and types, residue cover fraction, cover crop adoption, irrigation practices, erosion rate, planting and harvesting date, planting species, tile drainage condition, and/or cropping system).

Various embodiments provide highly accurate spatially and temporally resolved information on the crop and soil physical properties, nutrient status, stress conditions, and management practice information. Various embodiments provide information that is needed for agricultural stakeholders (e.g., farmers, commercial companies, research institutions, governmental sectors).

Referring now to FIG. 1A, a methodology flow chart according to an embodiment is shown. As shown, this embodiment utilizes four steps (102, 104, 106 and 108) to upscale Tier 1 ground truth of agroecosystem variables (see element 110) to Tier 2 mobile system-based agroecosystem variables (see element 118), and then upscale to Tier 3 satellite-based agroecosystem variables (see element 126). More particularly, for overlapping region(s) 114 of Tier 1 ground truth of agroecosystem variables 110 and geospatial data from mobile platforms 112, mobile system data-based model(s) 116 are used to generate the Tier 2 mobile system-based agroecosystem variables 118. Further, for overlapping region(s) 120 of Tier 2 mobile system-based agroecosystem variables 118 and satellite data 122, satellite data-based model(s) 124 are used to generate the Tier 3 satellite-based agroecosystem variables 126. Further still, it is shown that in this embodiment each of elements 110, 118 and 126 correspond to one or more respective labels; each of elements 112 and 122 corresponds to one or more respective features; and each of elements 116 and 124 corresponds to one or more respective statistical model(s), learning model(s), physics-based model(s), other model(s) and/or otherwise obtained relationship(s).

Referring now to FIG. 1B, various example details of Steps 1-4 of FIG. 1A are shown. More particularly, with respect to Step 1 (see, e.g., 102 of FIG. 1A), geospatial datasets from one or more efficient mobile systems 180 include a large corpus of unlabeled/unstructured data and a small subset accompanied by ground-truth labels. The small, labeled section (Tier 1: ground truth of agroecosystem variables) of data 180 is used to train a predictive model $M_A$. For example, the mobile systems 180 includes the subset of ground truth data, which is known and accurate representation of one or more physical properties and/or variables of the section of area. The model $M_A$ can then use this known information to apply it to the rest of the corpus of unlabeled/unstructured data to result in properties and/or variables of the data that represent the larger corpus of data. This is shown in Step 2, where model $M_A$ is applied on a section of datasets 182 to generate a much larger volume of "soft" labels associated with Tier 2 datasets.

With respect to Step 3, satellite datasets 186 include a large corpus of unlabeled/unstructured data. There is a union 188 between a portion of the satellite datasets 186 and the Tier 2 datasets 182. The union 188 includes an overlap wherein the ground-truth labels from Step 1 and/or the "soft labels" acquired in Step 2 overlap a portion of the large corpus 186 of satellite data (see, e.g., Step 3). Such an overlap and union 188 allows for the previously acquired labels of Step 1 and Step 2 to be applied to the unlabeled dataset of Step 3, which is used to create a model $M_B$, as is included in Step 4.

With respect to Step 4, a predictive model $M_B$ is trained using the labeled section (that is, the section with labels from Tier 2). Further, model $M_B$ is applied to generate labels for the whole or partial satellite datasets 186. Thus, the Tier 1 data with ground truth labels is utilized with one or more models (e.g., $M_A$ and/or $M_B$) to scale up the data from the small-scale are indicated by the Tier 1 data to the much larger scale of data provided by the satellite (Step 3) to quickly and accurately depict physical properties and/or variables associated with the land in the satellite dataset. This allows for the representation of land information (e.g., physical properties) for a large-scale area without needing to utilize ground-truth technology, which would be relatively cumbersome and time consuming.

As noted, the models can be trained in a number of ways including statistical models, process-based models, and machine learning models. For example, the models can use machine learning (ML). According to at least some aspects and/or embodiments, the ML can use the ground truth or other Tier 1 data as the training data for the algorithm. The datasets of the Tier 1 data could be the basis of Supervised Learning (SL), which is then used with the aerial data to determine overlapping areas. This model using the Tier 1 datasets with the overlapped information is used in the initial model, $M_A$, to create Tier 2 data, which becomes a new dataset. This Tier 2 dataset is then used in the SL model MB, wherein the Tier 2 data is the "known inputs", and the data is compared with the large-scale information from the satellites and/or other sources. The modeling of MB is used to create the Tier 3 data, creating the scaled data outputs.

A machine learning classifier is trained to identify the connection between historical feature values and historical training labels. Such machine-learned connections, referred to hereinafter as machine-learning models, between historical feature values and historical training labels can be "tested" using historical features and training labels that were not used in the training process. For example, every one out of ten years of historical data are held out (e.g., not used in the training process) to validate the performance of a machine-learnt connection. In this way, the best machine-learning model may be chosen among multiple models being validated. Moreover, a machine-learning model trained using historical feature values and historical training labels can be applied to current or future features to predict what should be the corresponding labels. Known algorithms for training a machine learning model that may be used according to various embodiments include, for example, supervised learning, unsupervised learning, statistical classification, association rule learning, hierarchical clustering, partitional clustering, reinforcement learning, and deep learning. The machine learning model may be a neural network, linear model, generalized additive model, random forest (e.g., ensemble method) model, gradient boosted regression model, or supported vector machine model, for example. In addition, the machine learning algorithm may be a weighted average of two or more of the algorithms mentioned above.

For the present disclosure, the classifier for $M_A$ may be trained using the ground truth data, quasi-ground truth data, or other Tier 1 data. As noted, this results in Tier 2 data, which can then be used as the classifier for $M_B$. Put another way, the classifier (Tier 1 data), once trained, becomes Tier 2 data, which is a new classifier. This can continue to be applied to additional models to allow for the scaling of the data from ground truth or quasi-ground truth levels (e.g., 0.1-1 km) to satellite levels (>100 km$^2$). This can then be applied and used across a number of locations.

Referring now to FIG. 2, shown is an example of an embodiment using airborne hyperspectral techniques (see element 202) as the mobile system to integrate ground truth (see element 202) with satellite data (see elements 204 and 206) to quantify agroecosystem variables. This embodiment includes using airborne remote sensing (e.g., hyperspectral imagery at 1 m resolution and at various bands (e.g., 400-2500 nm range, 3-5 nm spacing, 470 bands)) to derive highly accurate estimates for variables of interest as quasi "ground truth", and to train models with multi-source satellite fusion data (see element 204). In one example, field measurements (see element 202) can be integrated via model(s) and/or machine learning with the airborne based data (see arrows 202A, 202B). By applying the trained models, this embodiment can derive crop and soil traits for every farm on a large scale (e.g., the entire US Midwest; see e.g., element 206). This embodiment can provide unprecedentedly high spatiotemporal resolution (e.g., 10 m scale on a weekly frequency) and highly accurate maps of diverse crop biochemical and biophysical traits (e.g., nitrogen, phosphorus, photosynthetic capacity, plant diseases, plant pathogens, genotypes, stress conditions, photosynthesis, and/or yield) and/or soil traits (e.g., soil organic carbon content, nitrogen content, and/or phosphorus content). In another embodiment, the field measurements can provide real (or actual) ground truth data and such data from the field measurements can be utilized with or without use of the quasi "ground truth" data.

Figure 3:
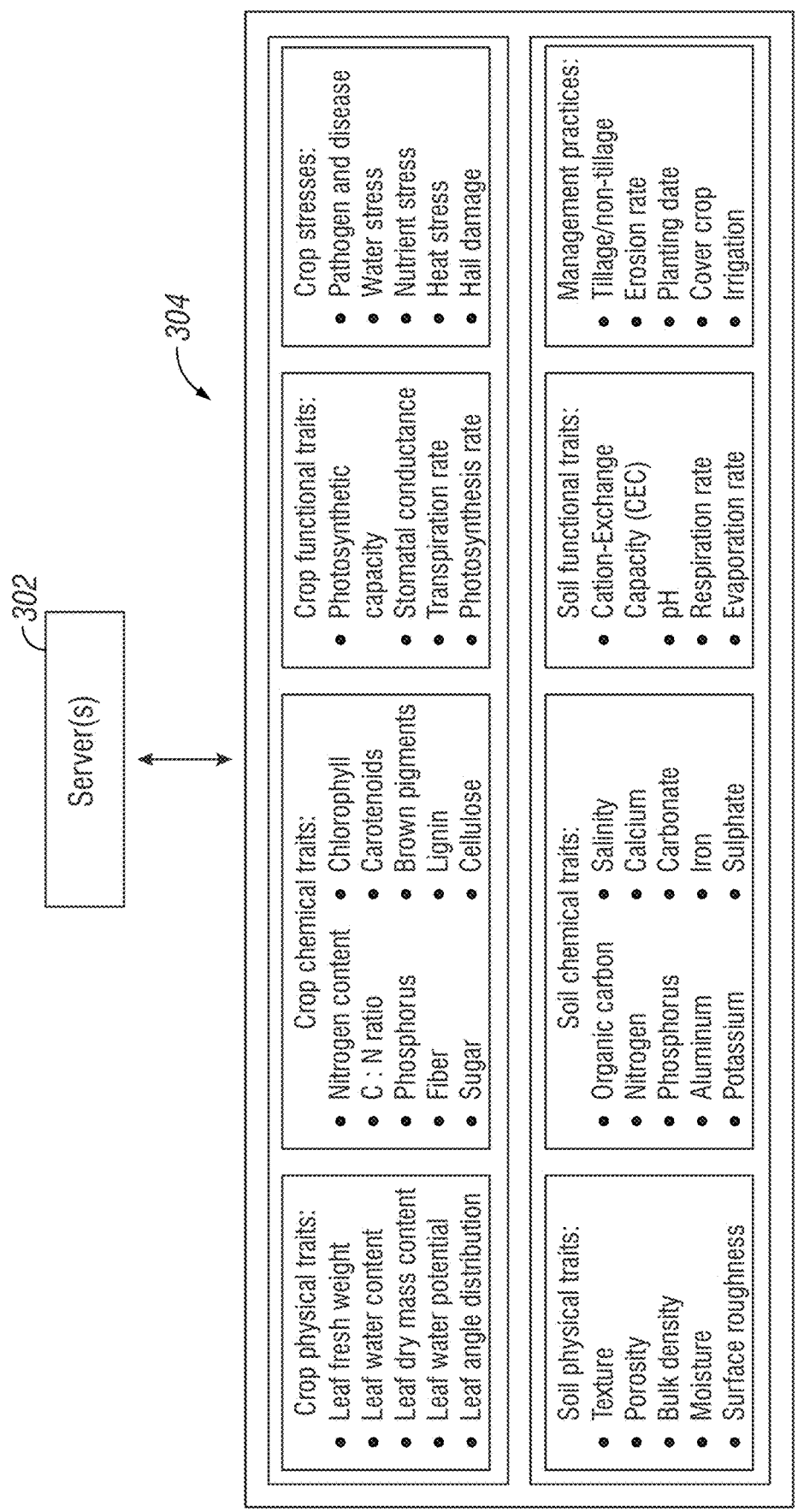
FIG. 3 shows a system according to aspects of one or more embodiments wherein one or more servers can operate as described herein to receive, estimate, determine, and/or output variables.

Referring now to FIG. 3, the figure shows a system 300 according to an embodiment wherein Server(s) 302 can operate as described herein to receive, predict, estimate, determine and/or output variables (see element 304) of crop traits, crop stresses, soil traits and management practices. In various examples, the crop physical traits can include: leaf fresh weight; leaf water content; leaf dry mass content; leaf water potential; and/or leaf angle distribution. In various examples, the crop chemical traits can include: nitrogen content; C:N ratio; phosphorus; fiber; sugar; chlorophyll; carotenoids; brown pigments; lignin; and/or cellulose. In various examples, the crop functional traits can include: photosynthetic capacity, stomatal conductance; transpiration rate; and/or photosynthesis rate. In various examples, the crop stresses can include: pathogen and disease; water/ drought stress; nutrient stress; heat stress; flooding/ponding/ oxygen stress, and/or hail damage. In various examples, the soil physical traits can include: texture; porosity; bulk density; moisture; and/or surface roughness. In various examples, the soil chemical traits can include: organic carbon; nitrogen; phosphorus; aluminum; potassium; salinity; calcium; carbonate; iron; and/or sulphate. In various examples, the soil functional traits can include: cation-exchange capacity (CEC); pH; respiration rate; and/or evaporation rate. In various examples, the management practices can include: tillage intensity and types, residue cover fraction, cover crop adoption, irrigation practices, erosion rate, planting and harvesting date, planting species, tile drainage condition, and/or cropping system. However, it should be appreciated that the lists shown in FIG. 3 and/or disclosed herein are to be considered non-limiting and provided for exemplary purposes.

Figure 4:
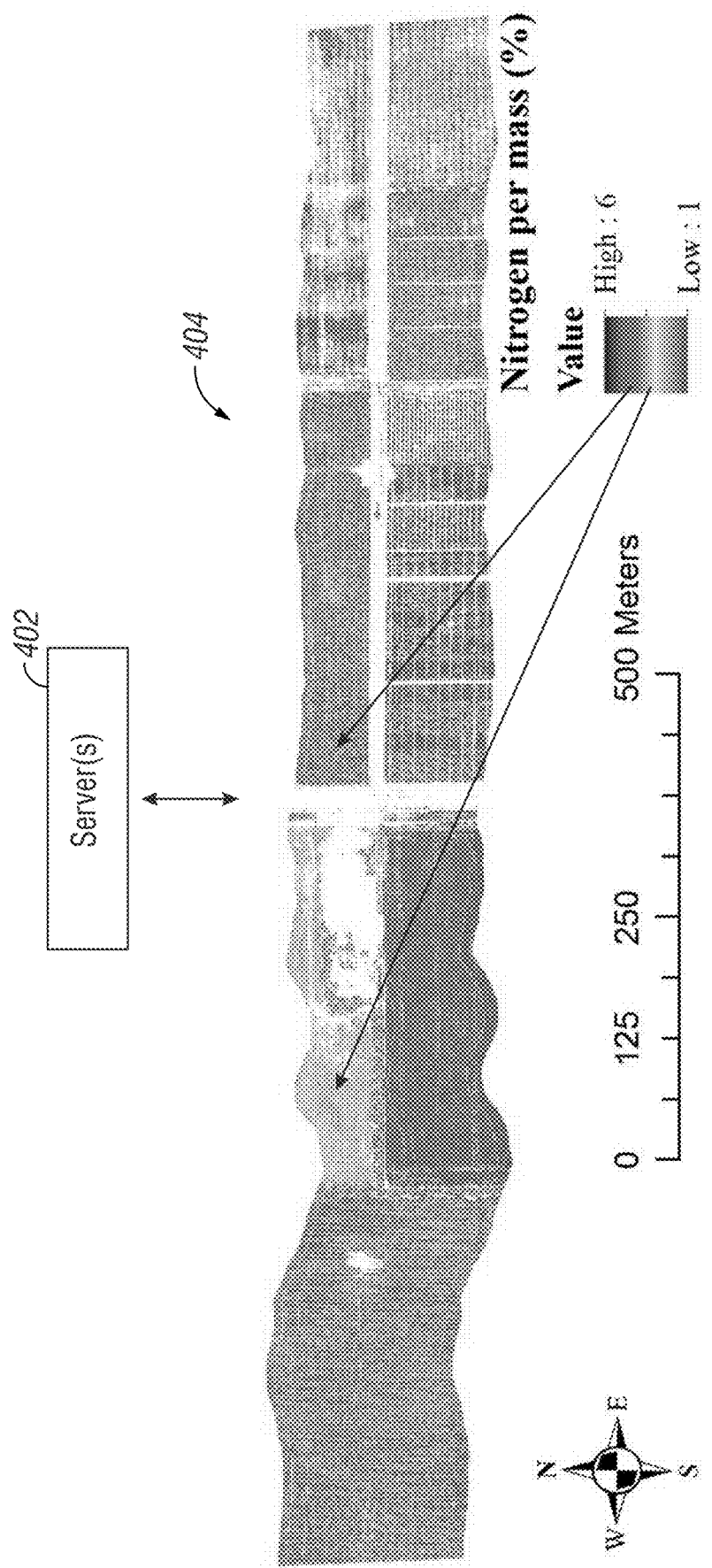
FIG. 4 shows a system according to aspects of one or more embodiments wherein one or more servers can operate as described herein to receive, estimate, determine, and/or output variables.

Referring now to FIG. 4, the figure shows a system 400 according to an embodiment wherein Server(s) 402 can operate as described herein to receive, predict, estimate, determine, and/or output agroecosystem variables and/or other associated data. More particularly, FIG. 4 shows an example of high-resolution crop nitrogen per mass (%) estimated from the airborne hyperspectral imagery in August 2019 at Champaign, Illinois (see element 404). The non-vegetated surface has been masked out with the white color. This dataset 404 can be used, for example, as Tier 2 mobile system-based agroecosystem variables according to various embodiments.

Figure 5:
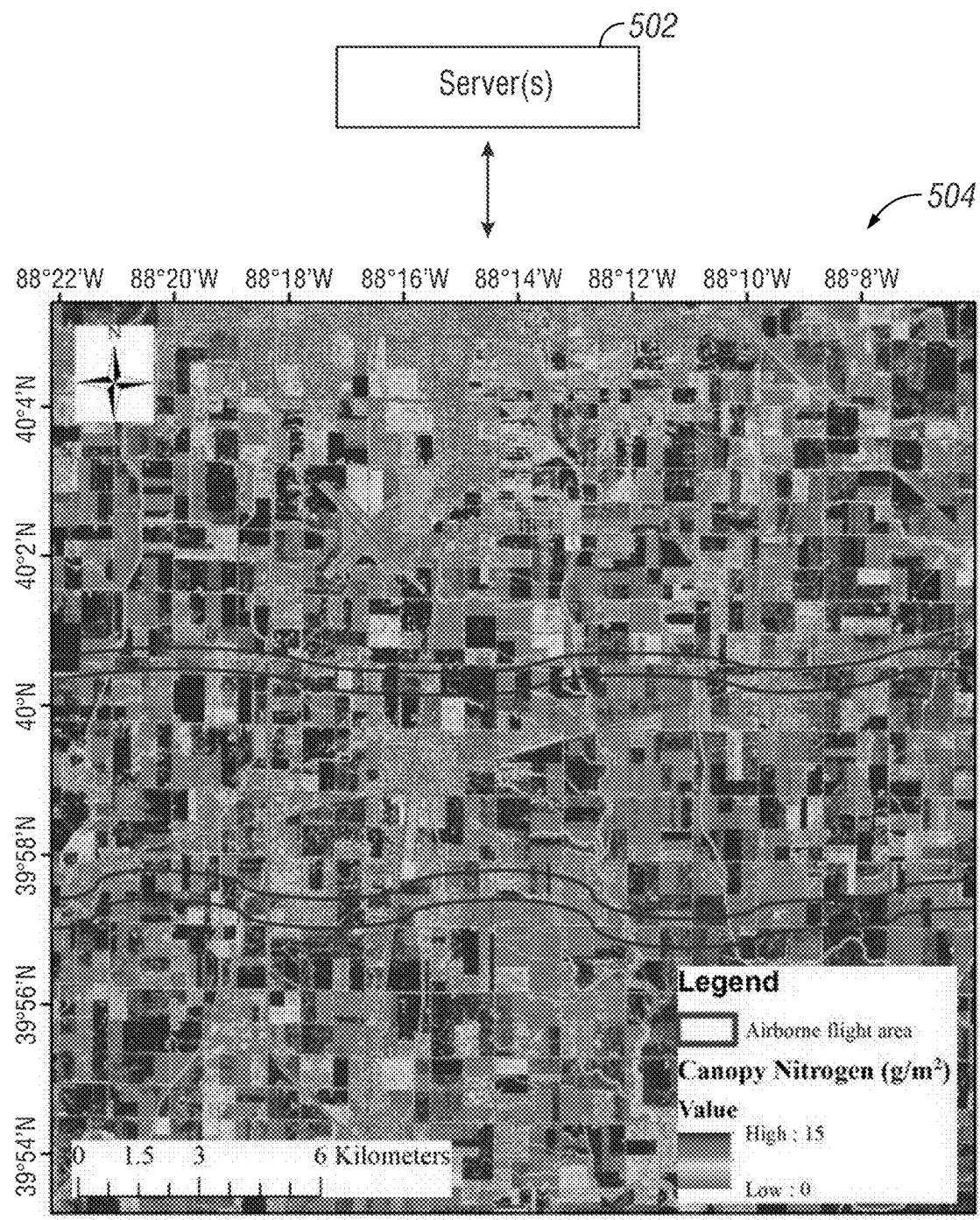
FIG. 5 shows a system according to aspects of one or more embodiments wherein one or more servers can operate as described herein to receive, estimate, determine, and/or output variables.

Referring now to FIG. 5, the figure shows a system 500 according to an embodiment wherein Server(s) 502 can operate as described herein to receive, predict, estimate, determine, and/or output agroecosystem variables and/or other associated data. More particularly, FIG. 5 shows an example of high-resolution crop nitrogen content (g/m2) estimated from the satellite data through an embodiment using airborne remote sensing data as the Tier 2 mobile system data and upscaling them to satellite estimates in August 2019 at Champaign, Illinois (see element 504).

Figure 6:
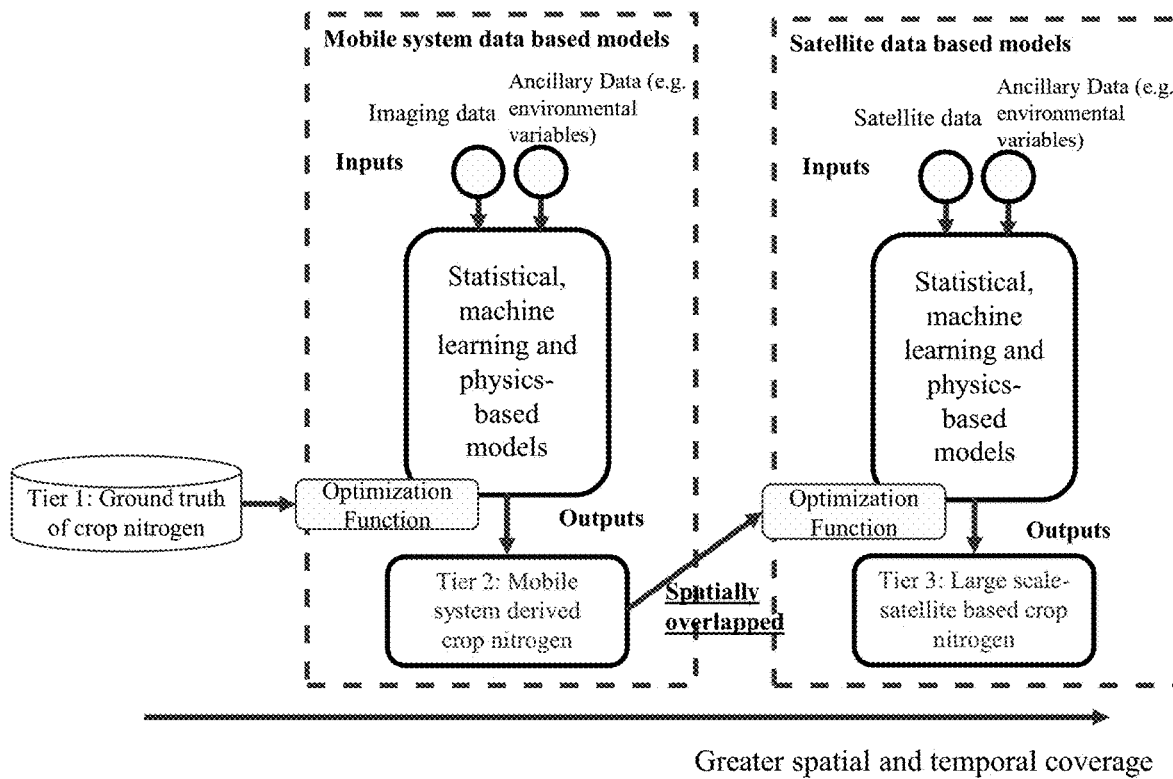
FIG. 6 shows an exemplary model showing aspects of one or more embodiments for illustrating how to upscale ground measured crop nitrogen (tier 1) to mobile system data (tier 2) and satellite data (tier 3).

Referring now to FIG. 6, an example of model diagram illustrating inputs and outputs for each step in an embodiment is provided where models are developed to integrate tier 1, 2 and 3 data to quantify crop nitrogen. According to at least some aspects and/or embodiments of the present disclosure, the models can be used to predict crop nitrogen. As shown in the figure, Tier 1 data refers to the ground truth of crop nitrogen, which has spatial and temporal overlaps with mobile system data (e.g., airborne hyperspectral data). The temporal overlaps can refer to the data collected at a common window, such as in a week or a month, or even a year depending on the targeted variables of interest, instead of overlapping at the exact time of data collection. However, according to some embodiments, it is recommended to collect different sources of data within a common week. With mobile system data including imaging data and ancillary data as inputs, the mobile system data-based models predict outputs, i.e., crop nitrogen. Through benchmarking with Tier 1 data to minimize loss function, the model system data-based model parameters are updated. As such, the embodiment derives highly accurate Tier 2 mobile system derived crop nitrogen in larger coverage compared to Tier 1. Furthermore, in the satellite data-based models, inputs include satellite data and ancillary data such as environmental variables. Through model benchmarking with Tier 2 mobile system derived highly accurate crop nitrogen, model parameters are updated to minimize loss function. As such, this invention can derive large-scale highly accurate satellite-based crop nitrogen.

Figure 7:
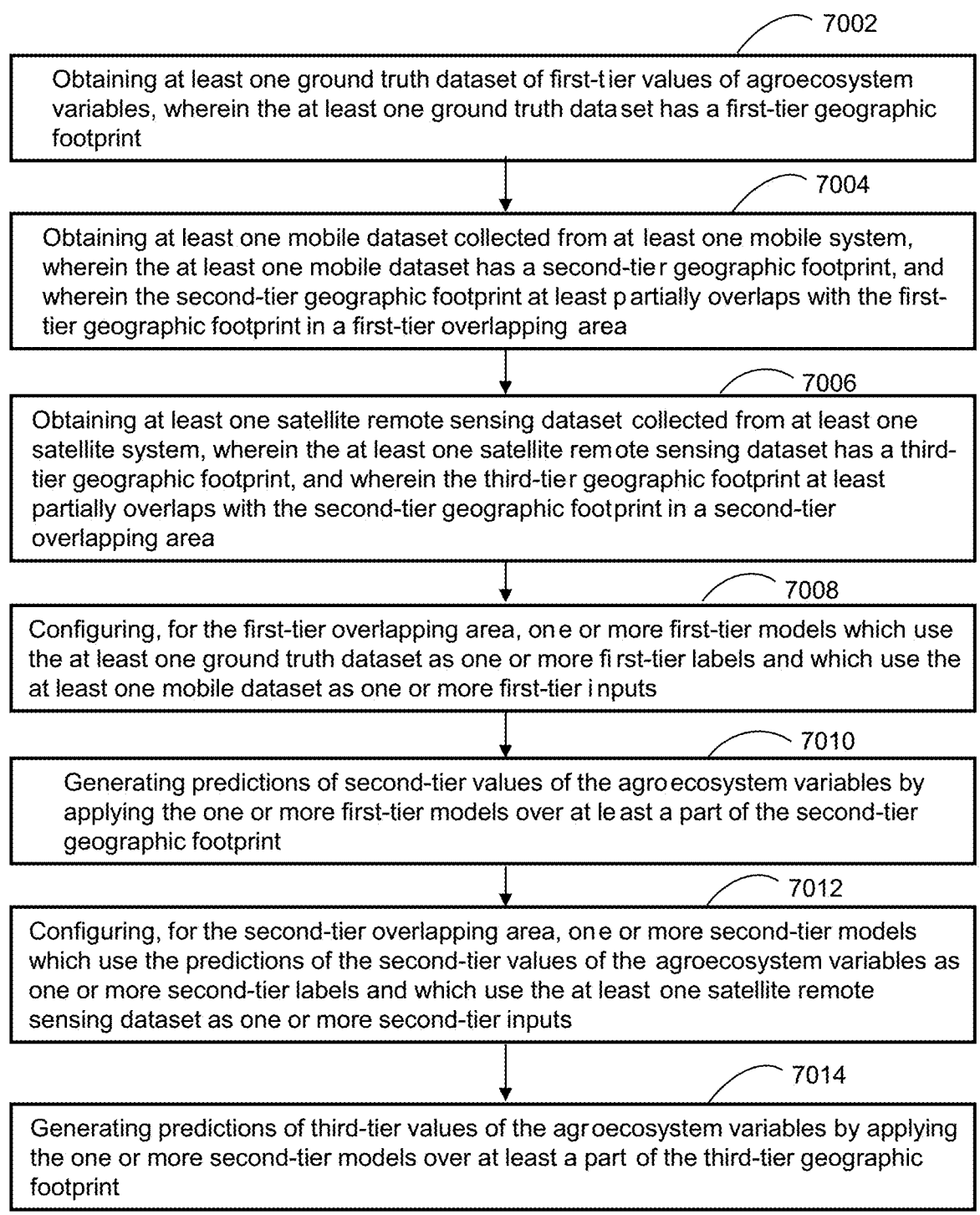
FIG. 7 depicts an illustrative embodiment of a method in accordance with various aspects described herein.

Referring now to FIG. 7, various steps of an exemplary embodiment of a method 7000 are shown. As shown in this FIG. 7, step 7002 comprises obtaining at least one ground truth dataset of first-tier values of agroecosystem variables, wherein the at least one ground truth dataset has a first-tier geographic footprint. Next, step 7004 comprises obtaining at least one mobile dataset collected from at least one mobile system, wherein the at least one mobile dataset has a second-tier geographic footprint, and wherein the second-tier geographic footprint at least partially overlaps with the first-tier geographic footprint in a first tier overlapping area. Next, step 7006 comprises obtaining at least one satellite remote sensing dataset collected from at least one satellite system, wherein the at least one satellite remote sensing dataset has a third-tier geographic footprint, and wherein the third-tier geographic footprint at least partially overlaps with the second-tier geographic footprint in a second tier overlapping area. Next, step 7008 comprises configuring, for the first tier overlapping area, one or more first-tier models which use the at least one ground truth dataset as one or more first-tier labels and which use the at least one mobile dataset as one or more first-tier inputs. Next, step 7010 comprises generating predictions of second-tier values of the agroecosystem variables by applying the one or more first-tier models over at least a part of the second-tier geographic footprint. Next, step 7012 comprises configuring, for the second tier overlapping area, one or more second-tier models which use the predictions of the second-tier values of the agroecosystem variables as one or more second-tier labels and which use the at least one satellite remote sensing dataset as one or more second-tier inputs. Next, step 7014 comprises generating predictions of third-tier values of the agroecosystem variables by applying the one or more second-tier models over at least a part of the third-tier geographic footprint. In various examples, each of the ground truth dataset(s), the mobile dataset(s), and the satellite remote sensing dataset(s) are different from one another. In various examples, each of the ground truth dataset(s), the mobile dataset(s), and the satellite remote sensing dataset(s) are collected using different mechanisms from one another. In various examples, the ground truth dataset(s) Comprise, such as, leaf tissue and/or soil sample element analysis, plant gas-exchange experiments, leaf spectra derived leaf traits, ground photo-derived management information, or any combination thereof. In various examples, the ground truth dataset(s) comprise data collected from field measurements.

In one example, the one or more first-tier models are different from the one or more second-tier models. In one example, the one or more first-tier models are a same as the one or more second-tier models. In one example, the one or more first-tier inputs are different from the one or more second-tier inputs. In one example, the one or more first-tier inputs are a same as the one or more second-tier inputs. In one example, the one or more first-tier models are applied over all of the second-tier geographic footprint. In one example, the one or more second-tier models are applied over all of the third-tier geographic footprint.

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
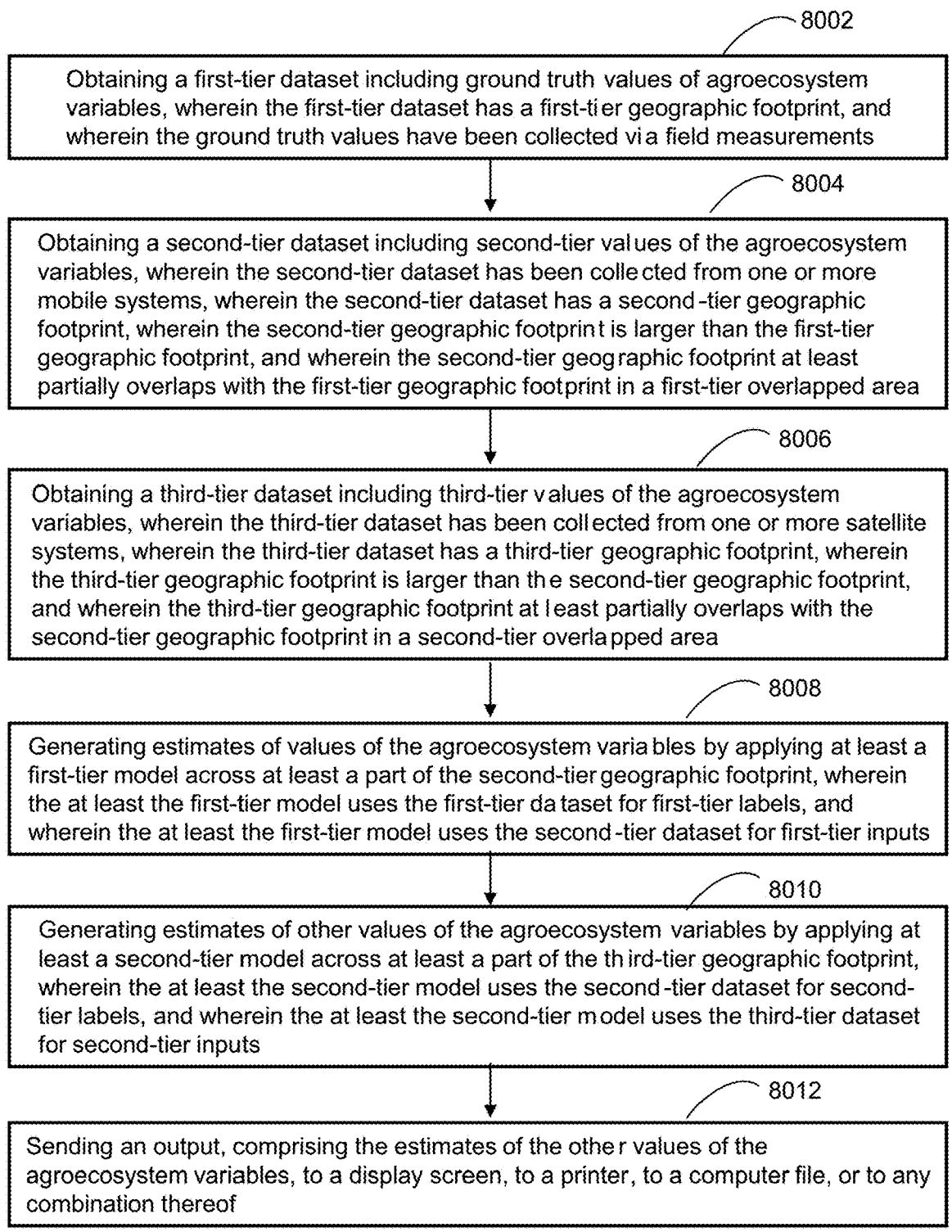
FIG. 8 depicts an illustrative embodiment of a method in accordance with various aspects described herein.

Referring now to FIG. 8, various steps of a method 8000 according to an embodiment are shown. As shown in FIG. 8, step 8002 comprises obtaining a first-tier dataset including ground truth values of agroecosystem variables, wherein the first-tier dataset has a first-tier geographic footprint, and wherein the ground truth values have been collected via field measurements. Next, step 8004 comprises obtaining a second-tier dataset including second-tier values of the agroecosystem variables, wherein the second-tier dataset has been collected from one or more mobile systems, wherein the second-tier dataset has a second-tier geographic footprint, wherein the second-tier geographic footprint is larger than the first-tier geographic footprint, and wherein the second-tier geographic footprint at least partially overlaps with the first-tier geographic footprint in a first-tier overlapped area. Next, step 8006 comprises obtaining a third-tier dataset including third-tier values of the agroecosystem variables, wherein the third-tier dataset has been collected from one or more satellite systems, wherein the third-tier dataset has a third-tier geographic footprint, wherein the third-tier geographic footprint is larger than the second-tier geographic footprint, and wherein the third-tier geographic footprint at least partially overlaps with the second-tier geographic footprint in a second-tier overlapped area. Next, step 8008 comprises generating estimates of values of the agroecosystem variables by applying at least a first-tier model across at least a part of the second-tier geographic footprint, wherein the at least the first-tier model uses the first-tier dataset for first-tier labels, and wherein the at least the first-tier model uses the second-tier dataset for first-tier inputs. Next, step 8010 comprises generating estimates of other values of the agroecosystem variables by applying at least a second-tier model across at least a part of the third-tier geographic footprint, wherein the at least the second-tier model uses the second-tier dataset for second-tier labels, and wherein the at least the second-tier model uses the third-tier dataset for second-tier inputs. Next, step 8012 comprises sending an output, comprising the estimates of the other values of the agroecosystem variables, to a display screen, to a printer, to a computer file, or to any combination thereof.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 9:
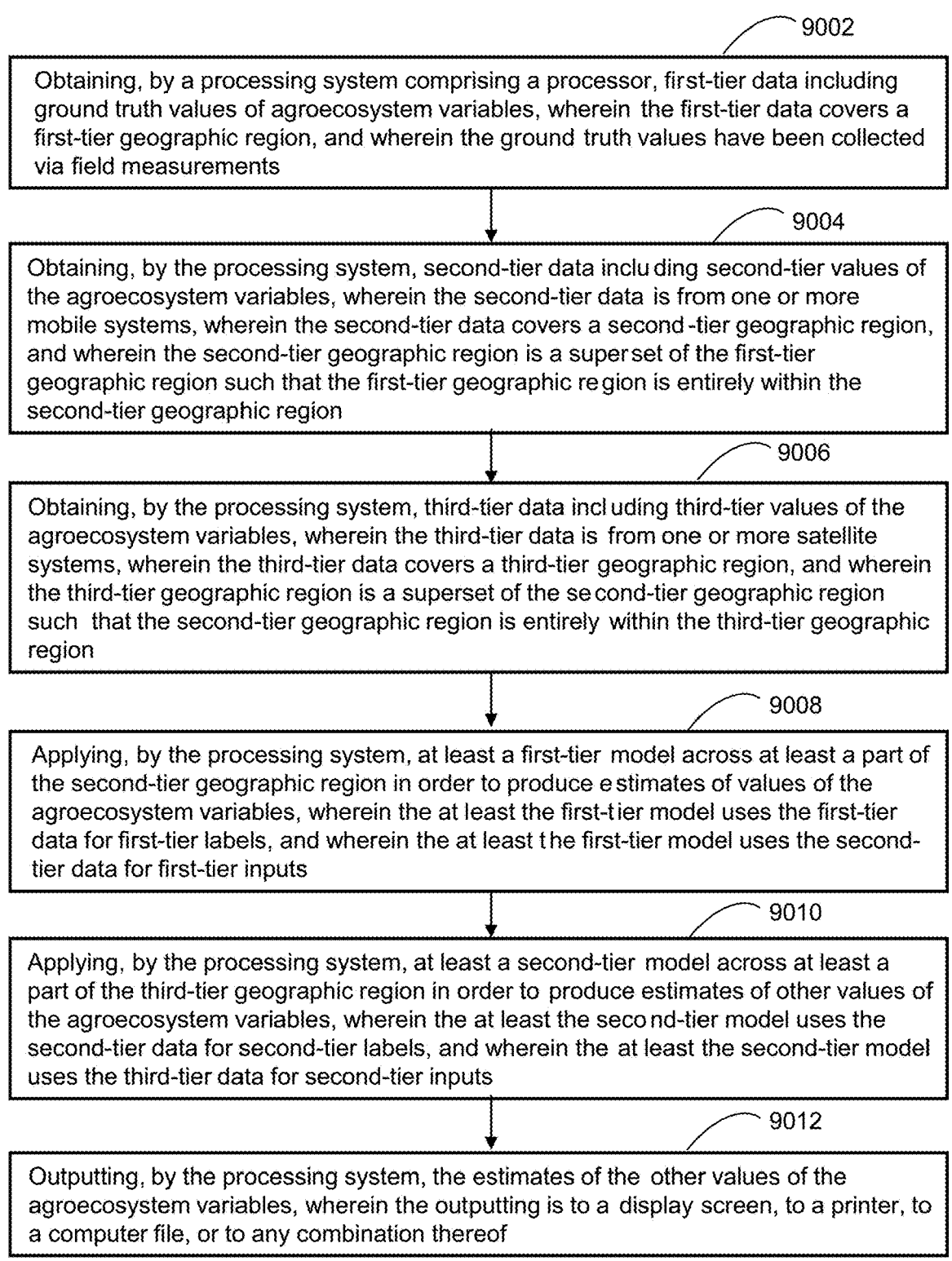
FIG. 9 depicts an illustrative embodiment of a method in accordance with various aspects described herein.

Referring now to FIG. 9, various steps of a method 9000 according to an embodiment are shown. As shown in this FIG. 9, step 9002 comprises obtaining, by a processing system comprising a processor, first-tier data including ground truth values of agroecosystem variables, wherein the first-tier data covers a first-tier geographic region, and wherein the ground truth values have been collected via field measurements. Next, step 9004 comprises obtaining, by the processing system, second-tier data including second-tier values of the agroecosystem variables, wherein the second-tier data is from one or more mobile systems, wherein the second-tier data covers a second-tier geographic region, and wherein the second-tier geographic region is a superset of the first-tier geographic region such that the first-tier geographic region is entirely within the second-tier geographic region. Next, step 9006 comprises obtaining, by the processing system, third-tier data including third-tier values of the agroecosystem variables, wherein the third-tier data is from one or more satellite systems, wherein the third-tier data covers a third-tier geographic region, and wherein the third-tier geographic region is a superset of the second-tier geographic region such that the second-tier geographic region is entirely within the third-tier geographic region. Next, step 9008 comprises applying, by the processing system, at least a first-tier model across at least a part of the second-tier geographic region in order to produce estimates of values of the agroecosystem variables, wherein the at least the first-tier model uses the first-tier data for first-tier labels, and wherein the at least the first-tier model uses the second-tier data for first-tier inputs. Next, step 9010 comprises applying, by the processing system, at least a second-tier model across at least a part of the third-tier geographic region in order to produce estimates of other values of the agroecosystem variables, wherein the at least the second-tier model uses the second-tier data for second-tier labels, and wherein the at least the second-tier model uses the third-tier data for second-tier inputs. Next, step 9012 comprises outputting, by the processing system, the estimates of the other values of the agroecosystem variables, wherein the outputting is to a display screen, to a printer, to a computer file, or to any combination thereof.

While for purposes of simplicity of explanation, the respective processes are shown and described as a series of blocks in FIG. 9, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 10:
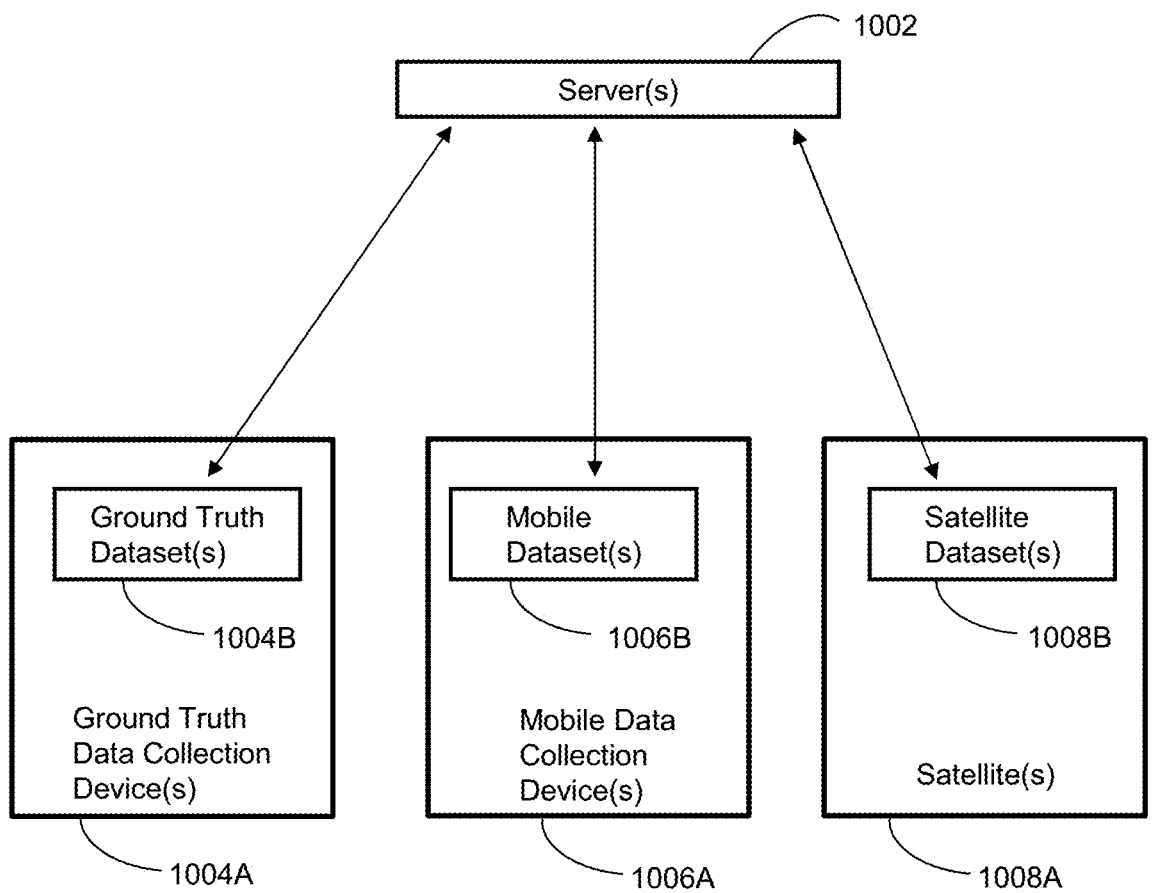
FIG. 10 shows a system according to at least some aspects of one or more embodiments wherein multi-tiers of data are in communication with one or more servers to scale physical variable data of an agroecosystem.

Referring now to FIG. 10, the figure depicts an illustrative embodiment of a system 1000 in accordance with various aspects described herein. As shown, Server(s) 1002 can receive Ground Truth Dataset(s) 1004B that have been collected by Ground Truth Data Collection Device(s) 1004A. In one example, the Server(s) 1002 can be in bi-directional communication with the Ground Truth Data Collection Device(s) 1004A. In one example, the Server(s) 1002 can be in direct communication with the Ground Truth Data Collection Device(s) 1004A. In another example, the Server(s) 1002 can be in indirect communication with the Ground Truth Data Collection Device(s) 1004A (e.g., via one or more intervening devices (not shown)). In another example, the Server(s) 1002 can be in communication with the Ground Truth Data Collection Device(s) 10004A via the Internet (not shown). In another example, the Server(s) 1002 can be in wireless and/or wired communication with the Ground Truth Data Collection Device(s) 1004A. In various examples, the Ground Truth Data Collection Device(s) 1004A can include one or more devices to acquire and/or to facilitate: leaf tissue and/or soil sample element analysis, plant gas-exchange experiments, leaf spectra derived leaf traits, ground-photo derived plant, soil, or management information, or any combination thereof.

Still referring to FIG. 10, it is shown that Server(s) 1002 can receive Mobile Dataset(s) 1006B that have been collected by Mobile Data Collection Device(s) 1006A. In one example, the Server(s) 1002 can be in bi-directional communication with the Mobile Data Collection Device(s) 1006A. In one example, the Server(s) 1002 can be in direct communication with the Mobile Data Collection Device(s) 1006A. In another example, the Server(s) 1002 can be in indirect communication with the Mobile Data Collection Device(s) 1006A (e.g., via one or more intervening devices (not shown)). In another example, the Server(s) 1002 can be in communication with the Mobile Data Collection Device(s) 1006A via the Internet (not shown). In another example, the Server(s) 1002 can be in wireless and/or wired communication with the Mobile Data Collection Device(s) 1006A. In various examples, the Mobile Data Collection Device(s) 1006A can be installed on and/or comprise a ground vehicle, a wheeled robot, a tracked robot, a wheeled vehicle, a tracked vehicle, an autonomous ground vehicle, an air vehicle, a drone, an autonomous air vehicle, an airplane, or any combination thereof. In other examples, the Mobile Data Collection Device(s) 1006A can collect data via camera(s), visible light sensor(s), non-visible light sensor(s), laser(s), or any combination thereof.

Still referring to FIG. 10, it is seen that Server(s) 1002 can receive Satellite Dataset(s) 1008B that have been collected by Satellites(s) 1008A. In one example, the Server(s) 1002 can be in bi-directional communication with the Satellites(s) 1008A. In one example, the Server(s) 1002 can be in direct communication with the Satellites(s) 1008A. In another example, the Server(s) 1002 can be in indirect communication with the Satellites(s) 1008A (e.g., via one or more intervening devices (not shown)). In another example, the Server(s) 1002 can be in communication with the Satellites(s) 1008A via the Internet (not shown). In another example, the Server(s) 1002 can be in wireless and/or wired communication with the Satellites(s) 1008A. In various examples, the Satellites(s) 1008A can collect data via camera(s), visible light sensor(s), non-visible light sensor(s), laser(s), or any combination thereof.

As described herein, various embodiments can operate via the collection of at least one ground truth dataset of agroecosystem variables (called "Tier 1 data" here), at least one dataset collected from one or more mobile systems (called "mobile system data" here, which can be, for example, an airborne remote sensing system and/or a ground vehicle based sensing system), and at least one satellite remote sensing dataset (called "satellite data" here), wherein the geographic footprints of the ground truth data and the mobile system data at least partially overlap, and wherein the geographic footprints of the mobile system data and the satellite data at least partially overlap. In one example, four steps as described below are used to upscale the ground truth of agroecosystem variables to the large scale:

Step 1: For the overlapped geographic footprints of the Tier 1 data and the mobile system data, configure model(s) and/or relationship(s) to predict (or estimate) first-tier values of agroecosystem variables, wherein the model(s) and/or relationship(s) use the Tier 1 data as one or more labels, and use the mobile system data as one or more inputs;

Step 2: Generate predictions (or estimates) of second-tier values of the agroecosystem variables (called "Tier 2 data" here) by applying the model(s) and/or relationship(s) of Step 1 over the whole or part of the geographic footprint of the mobile system data;

Step 3: For the overlapped geographic footprints of the mobile system data and the satellite data, configure one or more other model(s) and/or relationship(s) to predict (or estimate) third-tier values of the agroecosystem variables, wherein the other model(s) and/or relationship(s) use the Tier 2 data as one or more labels, and use the satellite data as one or more inputs; and Step 4: Generate predictions (or estimates) of values of the agroecosystem variables (called "Tier 3 data" here) by applying the model(s) and/or relationship(s) of Step 3 over the whole or part of the geographic footprint of the satellite data.

As described herein, an application of various embodiments is to apply airborne-satellite integrative remote sensing to derive crop traits, soil properties, and/or management practices. In the airborne-satellite integration, the airborne hyperspectral imaging system can be deployed to collect canopy and soil hyperspectral reflectance. Field experiments can be conducted to collect ground truth information such as crop biophysical and biochemical traits, crop management practices, and soil traits. Then, the very high spatial resolution (e.g., 0.1-1 m) airborne hyperspectral reflectance (e.g., 400-2500 nm, hundreds of bands) with state-of-the-art radiative transfer models and machine learning approaches can be utilized to accurately estimate crop and soil traits. By using the high spatial resolution airborne hyperspectral imagery, aspects of the present disclosure can be used to scale up the trait retrieval process from the leaf, to the canopy, to the landscape scale. The airborne techniques can largely reduce the uncertainties related to the scale mismatch. With crop and soil estimates from the airborne aspect, various embodiments can integrate airborne remote sensing and satellite data through models to derive agroecosystem variables such as shown, for example, in FIG. 2.

According to at least some embodiments, a real (or actual) ground truth can be obtained from field measurements. According to at least some embodiments, a quasi "ground truth" can be derived from mobile/airborne estimates that have very high accuracy and that are very close to the real (or actual) ground truth.

According to at least some embodiments, a ground truth dataset obtained through direct measurements or observations without inference information (such as collected via field measurements) can include data of agroecosystem variables from leaf or soil sample analysis, plant gas-exchange experiments, a tractor or robot-carried sensor derived soil/plant/management information, a leaf spectra derived leaf trait, LiDAR-derived crop/soil/management information, radar-derived crop/soil/management information, gamma-ray sensor derived crop/soil/management information, and/or ground photo-derived plant/soil/management information. Acquisition of such ground truth from field measurements can be accurate but time-consuming. According to at least some embodiments, values of a quasi "ground truth" dataset (e.g., from a mobile system and/or from an airborne system) can be very precise and close to the ground truth, but can be derived from much more efficient and indirect methods.

According to at least some embodiments, predictions described herein (e.g., predictions of values of certain agroecosystem variables) can be made by applying statistical models derived from (and/or based upon) machine learning, derived from (and/or based upon) process-based models, or derived from (and/or based upon) any combination thereof.

According to at least some embodiments, the final outputs can include high spatial resolution and high temporal resolution of biochemical and/or biophysical crop traits, biochemical and/or biophysical soil traits, and/or agricultural management practices. The biochemical and/or biophysical crop traits can include: genotypes, pigments (e.g., chlorophyll, carotenoids, and/or senescent materials); biophysical properties (e.g., leaf mass per area, leaf water content, leaf water potential, and/or leaf angle distribution); biochemical properties (e.g., nitrogen content, phosphorus content, carbon content, fiber content, sugar content, lignin content, cellulose content, calcium content, iron content, potassium content, and/or magnesium content); functional properties (e.g., photosynthetic capacity, stomatal conductance, photosynthesis rate, transpiration rate, and/or crop yield); and/or crop stress conditions (e.g., water/drought stress, nutrient stress, heat stress, hail storm stress, flooding/ponding/oxygen stress, plant pathogen stress, and/or plant disease stress). The estimated soil traits can include physical properties (e.g., texture, porosity, bulk density, and/or surface roughness); chemical properties (e.g., organic carbon content, nitrogen content, phosphorus content, aluminum content, potassium content, calcium content, carbonate content, iron content, sulphate content, and/or carbon stock); and/or functional properties (e.g., cation-exchange capacity, pH, respiration rate, and/or evaporation rate). The management practices can include tillage/non-tillage; soil erosion rate; timing of fertilization application, timing of herbicide application; planting date; harvesting date; and/or adoption of cover crop and its types.

Figure 11:
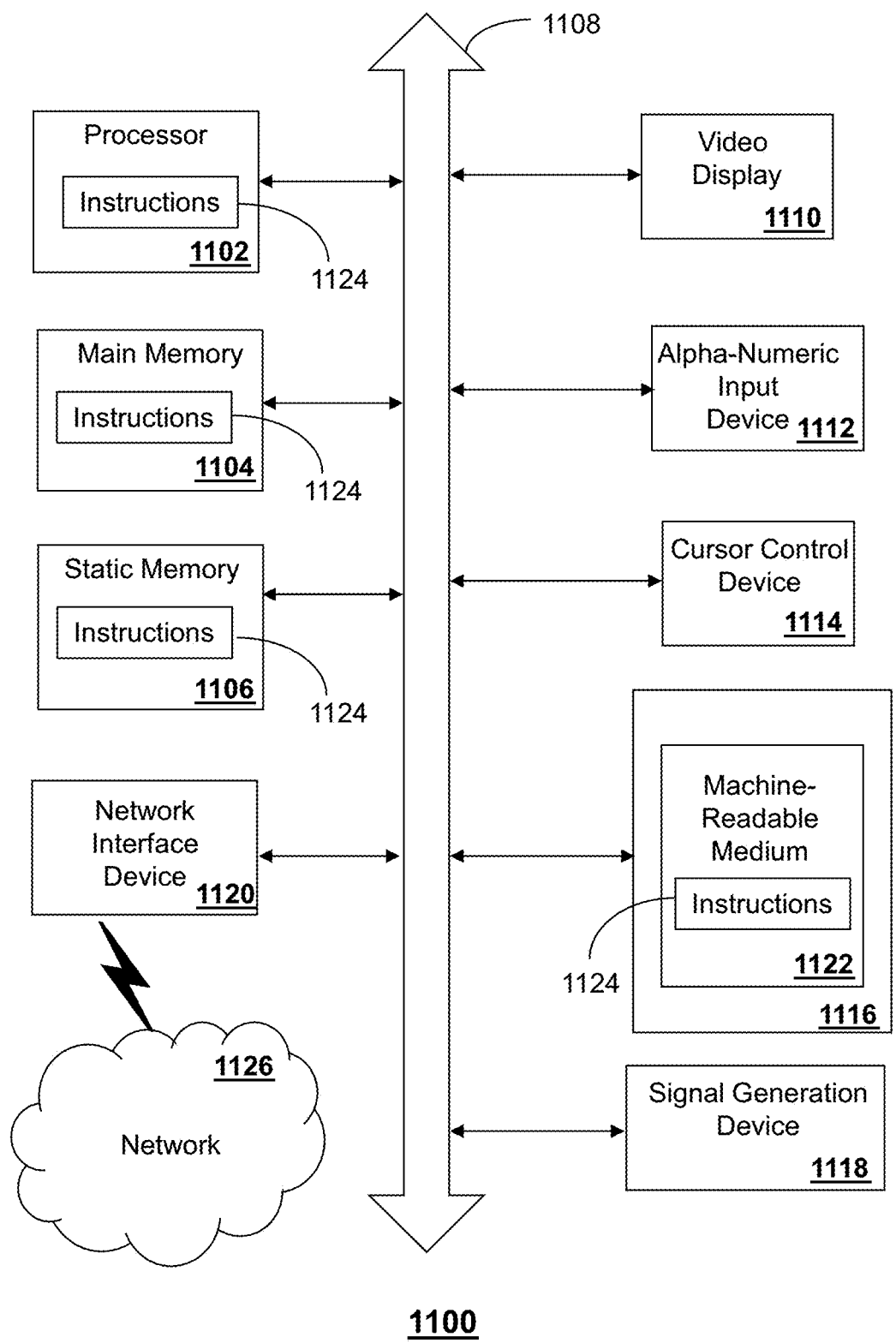
FIG. 11 depicts an illustrative diagrammatic representation of a machine in the form of a computer system within which a set of instructions, when executed, may cause the machine to perform any one or more of the methodologies disclosed herein.

Referring now to FIG. 11, the figure depicts an example diagrammatic representation of a machine in the form of a computer system 1100 within which a set of instructions, when executed, may cause the machine to perform any one or more of the methods discussed above. According to at least some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone or other handheld, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor 1102 (e.g., a central processing unit (CPU), a graphics processing unit (GPU, or both), a main memory 1104, and a static memory 1106, which communicate with each other via a bus 1108. The computer system 1100 may further include a video display unit 1110 (e.g., a user interface with a screen and/or a graphical user interface (GUI)), a flat panel, or a solid-state display. The computer system 1100 may also include one or more input devices 1112 (e.g., a keyboard), a cursor control device 1114 (e.g., a mouse), a disk drive unit 1116, a signal generation device 1118 (e.g., a speaker or remote control), and/or a network interface device 1120.

As noted, the computing system 1100 will preferably include an intelligent control (i.e., a controller) and components for establishing communications. Examples of such a controller may be processing units alone or other subcomponents of computing devices. The controller can also include other components and can be implemented partially or entirely on a semiconductor (e.g., a field-programmable gate array ("FPGA")) chip, such as a chip developed through a register transfer level ("RTL") design process.

A processing unit, also called a processor, is an electronic circuit which performs operations on some external data source, usually memory or some other data stream. Non-limiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions. Processing units are common in tablets, telephones, handheld devices, laptops, user displays, smart devices (TV, speaker, watch, etc.), and other computing devices.

A user interface is how the user interacts with a machine. The user interface can be a digital interface, a command-line interface, a graphical user interface ("GUI"), oral interface, virtual reality interface, or any other way a user can interact with a machine (user-machine interface). For example, the user interface ("UI") can include a combination of digital and analog input and/or output devices or any other type of UI input/output device required to achieve a desired level of control and monitoring for a device. Examples of input and/or output devices include computer mice, keyboards, touchscreens, knobs, dials, switches, buttons, speakers, microphones, LIDAR, RADAR, etc. Input(s) received from the UI can then be sent to a microcontroller to control operational aspects of a device. The user interface module can include a display, which can act as an input and/or output device. More particularly, the display can be a liquid crystal display ("LCD"), a light-emitting diode ("LED") display, an organic LED ("OLED") display, an electroluminescent display ("ELD"), a surface-conduction electron emitter display ("SED"), a field-emission display ("FED"), a thin-film transistor ("TFT") LCD, a bistable cholesteric reflective display (i.e., e-paper), etc. The user interface also can be configured with a microcontroller to display conditions or data associated with the main device in real-time or substantially real-time.

In some embodiments, the computer system 1100 could include one or more communications ports such as Ethernet, serial advanced technology attachment ("SATA"), universal serial bus ("USB"), or integrated drive electronics ("IDE"), for transferring, receiving, or storing data.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

In communications and computing, a computer readable medium is a medium capable of storing data in a format readable by a mechanical device. The term "non-transitory" is used herein to refer to computer readable media ("CRM") that store data for short periods or in the presence of power such as a memory device.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

The memory includes, in some embodiments, a program storage area and/or data storage area. The memory can comprise read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

Generally, the non-transitory computer readable medium operates under control of an operating system stored in the memory. The non-transitory computer readable medium implements a compiler which allows a software application written in a programming language such as COBOL, C++, FORTRAN, or any other known programming language to be translated into code readable by the central processing unit. After completion, the central processing unit accesses and manipulates data stored in the memory of the non-transitory computer readable medium using the relationships and logic dictated by the software application and generated using the compiler.

In at least some embodiments, the software application and the compiler are tangibly embodied in the computer-readable medium. When the instructions are read and executed by the non-transitory computer readable medium, the non-transitory computer readable medium performs the steps necessary to implement and/or use the present invention. A software application, operating instructions, and/or firmware (semi-permanent software programmed into read-only memory) may also be tangibly embodied in the memory and/or data communication devices, thereby making the software application a product or article of manufacture according to the present invention.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1122 is shown in an exemplary embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

Therefore, as is understood, the present disclosure provides aspects and/or embodiments for systems and/or methods that provide scalable measurement of agricultural carbon sequestration/credits with low uncertainty. The disclosure herein includes strong, remote sensing capacity with advanced process-based modelling to achieve the lowest uncertainty and utilizes machine learning and/or artificial intelligence (AI) to offer scalable solutions.

The disclosure, including any of the embodiments and/or aspects herein, further provides a method for scaling sensing technology validated for nitrogen and can be scaled from the field to large scale use. For example, it is contemplated that the system and methods could be used to scale the amount of nitrogen for every field in the Corn Belt, and even beyond. Exemplary scalable measurements capable of obtaining by the present disclosure includes, but should not be limited to, nitrogen content, photosynthetic capacity, and leaf area index, and integrates airborne and satellite sensing for scaling up.

Still further, the aspects and/or embodiments disclosed can be used to verify field-scale land management practices using various sources of satellite images. Using the scalable data and models verifies field-scale tillage practices, cover crop presence, and planting and harvest date by combining high-res cloud-free gap-free satellite images with machine learning models, as included herein.

Still further, the invention could be used for a variety of non-limiting additional uses, including, for example, insurance purposes, land sales/realty, erosion mapping, historical data and land management, and the like. For example, insurance companies could use the information in a field and compare the field to similar fields with similar field characteristics and/or physical traits (e.g., nitrogen levels) to categorize the field based upon how the field should perform for a given crop and weather conditions. The insurance company could then use the information to make an informed decision on any claim by an owner and/or user (farmer) of the land. The information obtained via the scaled modeling system provided could also be beneficial for sales (realty), such that the farm could be quickly and easily compared with one or more similar fields, whether in a similar area or not, to provide data that could be used to base and/or justify a price.

As has been included in the disclosure, many of the connections, such as those shown and/or described with respect to the connections between the servers and any of the collection devices, sensors, satellites, and the like, can be wired and/or wireless. It is further envisioned that the system can utilize cloud computing.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure comprising a network of interconnected nodes. The cloud computing can include use of a Private cloud (the cloud infrastructure is operated solely for an organization, and it may be managed by the organization or a third party and may exist on-premises or off-premises), Community cloud (the cloud infrastructure is shared by several organizations and supports a specific community that has shared concerns (e.g., mission, security requirements, policy, and compliance considerations), and it may be managed by the organizations or a third party and may exist on-premises or off-premises), Public cloud (the cloud infrastructure is made available to the general public or a large industry group and is owned by an organization selling cloud services), or a Hybrid cloud (the cloud infrastructure is a composition of two or more clouds (private, community, or public) that remain unique entities but are bound together by standardized or proprietary technology that enables data and application portability (e.g., cloud bursting for load balancing between clouds)).

In other embodiments of wireless connectivity, on or more networks are used. In some embodiments, the network is, by way of example only, a wide area network ("WAN") such as a TCP/IP based network or a cellular network, a local area network ("LAN"), a neighborhood area network ("NAN"), a home area network ("HAN"), or a personal area network ("PAN") employing any of a variety of communication protocols, such as Wi-Fi, Bluetooth, ZigBee, near field communication ("NFC"), etc., although other types of networks are possible and are contemplated herein. The network typically allows communication between the communications module and the central location during moments of low-quality connections. Communications through the network can be protected using one or more encryption techniques, such as those techniques provided by the Advanced Encryption Standard (AES), which superseded the Data Encryption Standard (DES), the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

When wired connectivity is utilized, the system may utilize Ethernet. Ethernet is a family of computer networking technologies commonly used in local area networks ("LAN"), metropolitan area networks ("MAN") and wide area networks ("WAN"). Systems communicating over Ethernet divide a stream of data into shorter pieces called frames. Each frame contains source and destination addresses, and error-checking data so that damaged frames can be detected and discarded; most often, higher-layer protocols trigger retransmission of lost frames. As per the OSI model, Ethernet provides services up to and including the data link layer. Ethernet was first standardized under the Institute of Electrical and Electronics Engineers ("IEEE") 802.3 working group/collection of IEEE standards produced by the working group defining the physical layer and data link layer's media access control ("MAC") of wired Ethernet. Ethernet has since been refined to support higher bit rates, a greater number of nodes, and longer link distances, but retains much backward compatibility. Ethernet has industrial application and interworks well with Wi-Fi. The Internet Protocol ("IP") is commonly carried over Ethernet and so it is considered one of the key technologies that make up the Internet.

The Internet Protocol ("IP") is the principal communications protocol in the Internet protocol suite for relaying datagrams across network boundaries. Its routing function enables internetworking, and essentially establishes the Internet. IP has the task of delivering packets from the source host to the destination host solely based on the IP addresses in the packet headers. For this purpose, IP defines packet structures that encapsulate the data to be delivered. It also defines addressing methods that are used to label the datagram with source and destination information.

The Transmission Control Protocol ("TCP") is one of the main protocols of the Internet protocol suite. It originated in the initial network implementation in which it complemented the IP. Therefore, the entire suite is commonly referred to as TCP/IP. TCP provides reliable, ordered, and error-checked delivery of a stream of octets (bytes) between applications running on hosts communicating via an IP network. Major internet applications such as the World Wide Web, email, remote administration, and file transfer rely on TCP, which is part of the Transport Layer of the TCP/IP suite.

Transport Layer Security, and its predecessor Secure Sockets Layer ("SSL/TLS"), often runs on top of TCP. SSL/TLS are cryptographic protocols designed to provide communications security over a computer network. Several versions of the protocols find widespread use in applications such as web browsing, email, instant messaging, and voice over IP ("VoIP"). Websites can use TLS to secure all communications between their servers and web browsers.

As noted, and in addition to that previously included the term "tangible computer-readable storage medium" can accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

The terms "first," "second," "third," and so forth, as used in the claims, unless otherwise clear by context, is for clarity only and does not otherwise indicate or imply any order in time. For instance, "a first-tier determination," "a second-tier determination," and "a third-tier determination," does not indicate or imply that the first-tier determination is to be made before the second-tier determination, or vice versa, etc.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding vehicle movement history, user preferences, and so forth can be accessed. This information can be obtained by various methods including user input, detecting types of communications, analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

The database is a structured set of data typically held in a computer. The database, as well as data and information contained therein, need not reside in a single physical or electronic location. For example, the database may reside, at least in part, on a local storage device, in an external hard drive, on a database server connected to a network, on a cloud-based storage system, in a distributed ledger (such as those commonly used with blockchain technology), or the like.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" can indicate, for example, the beginning of the first-tier step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first-tier item to a second-tier item may be modified by one or more intervening items by modifying the form, nature, or format of information in a signal, while one or more elements of the information in the signal are nevertheless conveyed in a manner than can be recognized by the second-tier item. In a further example of indirect coupling, an action in a first-tier item can cause a reaction on the second-tier item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

From the foregoing, it can be seen that the invention accomplishes at least all of the stated objectives.

The invention claimed is:

1. A non-transitory computer-readable storage medium comprising executable instructions that, when executed by a processing system including a processor, perform operations, the operations comprising:
   obtaining a first-tier dataset including ground truth values of agroecosystem variables, wherein the first-tier dataset has a first-tier geographic footprint, and wherein the ground truth values have been collected via field measurements;
   obtaining a second-tier dataset including second-tier values of the agroecosystem variables, wherein the second-tier dataset has been collected from one or more mobile systems, wherein the second-tier dataset has a second-tier geographic footprint, wherein the second-tier geographic footprint is larger than the first-tier geographic footprint, and wherein the second-tier geographic footprint at least partially overlaps with the first-tier geographic footprint in a first tier overlapped area;
   obtaining a third-tier dataset including third-tier values of the agroecosystem variables, wherein the third-tier dataset has been collected from one or more satellite systems, wherein the third-tier dataset has a third-tier geographic footprint, wherein the third-tier geographic footprint is larger than the second-tier geographic footprint, and wherein the third-tier geographic footprint at least partially overlaps with the second-tier geographic footprint in a second tier overlapped area;
   generating estimates of values of the agroecosystem variables by applying at least a first-tier model across at least a part of the second-tier geographic footprint, wherein the at least the first-tier model uses the first-tier dataset for first-tier labels, and wherein the at least the first-tier model uses the second-tier dataset for first-tier inputs; and
   generating estimates of secondary values of the agroecosystem variables by applying at least a second-tier model across at least a part of the third-tier geographic footprint, wherein the at least the second-tier model uses the second-tier dataset for second-tier labels, and wherein the at least the second-tier model uses the third-tier dataset for second-tier inputs.

2. The non-transitory computer-readable storage medium of claim 1, wherein the operations further comprise sending an output comprising the estimates of the secondary values of the agroecosystem variables, to a display screen, to a printer, to a computer file, or to any combination thereof.

3. The non-transitory computer-readable storage medium of claim 2, wherein the operations further comprise mapping the output of the third-tier values of the agroecosystem variables on a geographic map.

4. The non-transitory computer-readable storage medium of claim 1, wherein the applying the at least the first-tier model across at least part of the second-tier geographic footprint comprises:
   applying the at least the first-tier model across all of the second-tier geographic footprint; and
   the applying the at least the second-tier model across at least part of the third-tier geographic footprint comprises applying the at least the second-tier model across all of the third-tier geographic footprint.

5. The non-transitory computer-readable storage medium of claim 4, wherein the field measurements have been collected from the ground; and
   the ground truth values obtained through direct measurements or observations without inference information include one or more agroecosystem variables based upon: a leaf sample analysis, a soil sample analysis, a field-level condition analysis, a plant gas-exchange experiment, a tractor or robot-carried sensor derived soil/plant/management information, a leaf spectra derived leaf trait, LiDAR-derived crop/soil/management information, radar-derived crop/soil/management information, gamma-ray sensor derived crop/soil/management information, ground-photo derived plant/soil/management information, or any combination thereof.

6. The non-transitory computer-readable storage medium of claim 1, wherein the agroecosystem variables comprise: one or more crop traits; one or more soil traits; one or more agricultural management practices; or any combination thereof.

7. The non-transitory computer-readable storage medium of claim 6, wherein the one or more crop traits comprise:
one or more biochemical crop traits;
one or more biophysical crop traits; or
any combination thereof.

8. The non-transitory computer-readable storage medium of claim 7, wherein the one or more soil traits comprise:
one or more biochemical soil traits;
one or more biophysical soil traits; or
any combination thereof.

9. The non-transitory computer-readable storage medium of claim 8, wherein the one or more crop traits comprise:
one or more pigments;
one or more biophysical properties;
one or more biochemical properties;
one or more crop functional properties;
one or more crop stress conditions;
or any combination thereof.

10. The non-transitory computer-readable storage medium of claim 9, wherein the one or more soil traits comprise:
one or more physical properties;
one or more chemical properties;
one or more soil functional properties;
one or more amounts of soil organic carbon;
or any combination thereof.

11. The non-transitory computer-readable storage medium of claim 1, wherein the operations further comprise training a classifier of the first tier model using the first tier dataset that is overlapped with the second-tier geographic footprint that at least partially overlaps with the first-tier geographic footprint in a first tier overlapped area.

12. The non-transitory computer-readable storage medium of claim 1, wherein the operations further comprise training a classifier of the second tier model using the second tier dataset that is overlapped with the third-tier geographic footprint that at least partially overlaps with the second-tier geographic footprint in a second tier overlapped area.

13. The non-transitory computer-readable storage medium of claim 1, wherein the operations further comprise outputting a mapped area with agroecosystem variables on a display.

14. The non-transitory computer-readable storage medium of claim 13, wherein the mapped area comprises the third tier geographic footprint overlayed with the agroecosystem variables.

15. A device comprising:
a processing system including a processor; and
a memory that stores executable instructions that, when executed by the processing system, perform operations, the operations comprising:
  obtaining at least one ground truth dataset of first-tier values of agroecosystem variables, wherein the at least one ground truth dataset has a first-tier geographic footprint;
  obtaining at least one mobile dataset collected from at least one mobile system, wherein the at least one mobile dataset has a second-tier geographic footprint, and wherein the second-tier geographic footprint at least partially overlaps with the first-tier geographic footprint in a first tier overlapping area;
  obtaining at least one satellite remote sensing dataset collected from at least one satellite system, wherein the at least one satellite remote sensing dataset has a third-tier geographic footprint, and wherein the third-tier geographic footprint at least partially overlaps with the second-tier geographic footprint in a second tier overlapping area;
  configuring, for the first tier overlapping area, one or more first-tier models which use the at least one ground truth dataset as one or more first-tier labels and which use the at least one mobile dataset as one or more first-tier inputs;
  generating predictions of second-tier values of the agroecosystem variables by applying the one or more first-tier models over at least a part of the second-tier geographic footprint;
  configuring, for the second tier overlapping area, one or more second-tier models which use the predictions of the second-tier values of the agroecosystem variables as one or more second-tier labels and which use the at least one satellite remote sensing dataset as one or more second-tier inputs; and
  generating predictions of third-tier values of the agroecosystem variables by applying the one or more second-tier models over at least a part of the third-tier geographic footprint.

16. The device of claim 15, wherein the operations further comprise outputting the predictions of the third-tier values of the agroecosystem variables, wherein the outputting is to a display screen, to a printer, to a computer file, or to any combination thereof.

17. The device of claim 16, wherein the predictions of the third-tier values of the agroecosystem variables are output via a mapping of the predictions of the third-tier values of the agroecosystem variables on a geographic map.

18. The device of claim 15, wherein:
the generating the predictions of the second-tier values of the agroecosystem variables further comprises applying one or more first-tier models over at least a part of the second-tier geographic footprint;
the generating the predictions of the third-tier values of the agroecosystem variables further comprises applying one or more second-tier models over at least a part of the third-tier geographic footprint; and
each of the one or more first-tier models and the one or more second-tier models is based on respective machine learning, one or more respective processed-based models, or any respective combination thereof.

19. A method comprising:
obtaining, by a processing system comprising a processor, first-tier data including ground truth values of agroecosystem variables, wherein the first-tier data covers a first-tier geographic region, and wherein the ground truth values have been collected via field measurements;
obtaining, by the processing system, second-tier data including second-tier values of the agroecosystem variables, wherein the second-tier data is from one or more mobile systems, wherein the second-tier data covers a second-tier geographic region, and wherein the second-tier geographic region is a superset of the first-tier geographic region such that the first-tier geographic region is entirely within the second-tier geographic region;
obtaining, by the processing system, third-tier data including third-tier values of the agroecosystem variables, wherein the third-tier data is from one or more satellite systems, wherein the third-tier data covers a third-tier geographic region, and wherein the third-tier geographic region is a superset of the second-tier geographic region such that the second-tier geographic region is entirely within the third-tier geographic region;

applying, by the processing system, at least a first-tier model across at least a part of the second-tier geographic region in order to produce estimates of values of the agroecosystem variables, wherein the at least the first-tier model uses the first-tier data for first-tier labels, and wherein the at least the first-tier model uses the second-tier data for first-tier inputs;

applying, by the processing system, at least a second-tier model across at least a part of the third-tier geographic region in order to produce estimates of other values of the agroecosystem variables, wherein the at least the second-tier model uses the second-tier data for second-tier labels, and wherein the at least the second-tier model uses the third-tier data for second-tier inputs; and outputting, by the processing system, the estimates of the other values of the agroecosystem variables, wherein the outputting is to a display screen, to a printer, to a computer file, or to any combination thereof.

20. The method of claim 19, wherein:
the second-tier data has a second-tier spatial resolution;
the second-tier data has a second-tier spectral resolution;
the third-tier data has a third-tier spatial resolution;
the third-tier data has a third-tier spectral resolution;
the second-tier spatial resolution is higher than the third-tier spatial resolution, the second-tier spectral resolution is higher than the third-tier spectral resolution;
the field measurements have been collected from the ground; and
the ground truth values obtained through direct measurements or observations without inference information include one or more agroecosystem variables based upon: a leaf sample analysis, a soil sample analysis, a field-level condition analysis, a plant gas-exchange experiment, a tractor or robot-carried sensor derived soil/plant/management information, a leaf spectra derived leaf trait, LiDAR-derived crop/soil/management information, radar-derived crop/soil/management information, gamma-ray sensor derived crop/soil/management information, and or ground-photo derived plant/soil/management information, or any combination thereof.

* * * * *